(12) United States Patent
Horvitz et al.

(10) Patent No.: US 7,774,349 B2
(45) Date of Patent: Aug. 10, 2010

(54) STATISTICAL MODELS AND METHODS TO SUPPORT THE PERSONALIZATION OF APPLICATIONS AND SERVICES VIA CONSIDERATION OF PREFERENCE ENCODINGS OF A COMMUNITY OF USERS

(75) Inventors: Eric J. Horvitz, Kirkland, WA (US); Johnson T. Apacible, Mercer Island, WA (US); Murugesan S. Subramani, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 10/882,867

(22) Filed: Jun. 30, 2004

(65) Prior Publication Data

US 2005/0132014 A1 Jun. 16, 2005

Related U.S. Application Data

(60) Provisional application No. 60/528,597, filed on Dec. 11, 2003.

(51) Int. Cl.
*G06F 17/30* (2006.01)
(52) U.S. Cl. ...................... 707/749; 707/754
(58) Field of Classification Search ............... 707/1–10
See application file for complete search history.

(56) References Cited

U.S. PATENT DOCUMENTS

| | | | |
|---|---|---|---|
| 5,493,692 | A | 2/1996 | Theimer et al. |
| 5,544,321 | A | 8/1996 | Theimer et al. |

(Continued)

FOREIGN PATENT DOCUMENTS

WO 9800787 1/1998

OTHER PUBLICATIONS

Ungar and Foster, Clustering methods for collaborative filtering, Jul. 1998, Workshop on Recommendation Systems at the Fifteenth National Conference on Artificial Intelligence.*

(Continued)

*Primary Examiner*—Tim T. Vo
*Assistant Examiner*—Sangwoo Ahn
(74) *Attorney, Agent, or Firm*—Wolf, Greenfield & Sacks, P.C.

(57) ABSTRACT

A statistical methodology is employed for assisting people with the setting of parameters of software applications or services. With the method, information about demographics and/or about the complete or partial preferences of other people, are analyzed to infer recommendations for settings and functionality of a computer application or service. A system is reviewed with the ability to receive data regarding a plurality of users, and stores respective profiles for these users in a community store. The system can leverage off of these completed and/or partially completed profiles of parameters representing preferences about software operation in connection with building new profiles for users (new and/or existing). Data regarding a user that desires to build a new profile is employed in connection with the community profiles to facilitate the user building a personalized profile. Various statistical and/or probabilistic schemes can be employed, for example, collaborative filtering techniques to identify to the user the top n settings by particular parameter(s), top m settings by popularity, top x most similar profiles to facilitate the user selecting most appropriate sub-profiles as part of a personalized profile building and selection effort.

18 Claims, 22 Drawing Sheets

U.S. PATENT DOCUMENTS

| | | | |
|---|---|---|---|
| 5,555,376 | A | 9/1996 | Theimer et al. |
| 5,603,054 | A | 2/1997 | Theimer et al. |
| 5,611,050 | A | 3/1997 | Theimer et al. |
| 5,812,865 | A | 9/1998 | Theimer et al. |
| 6,112,186 | A * | 8/2000 | Bergh et al. .................. 705/10 |
| 6,353,398 | B1 | 3/2002 | Amin et al. |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,672,506 | B2 | 1/2004 | Swartz et al. |
| 6,741,188 | B1 | 5/2004 | Miller et al. |
| 6,747,675 | B1 | 6/2004 | Abbott et al. |
| D494,584 | S | 8/2004 | Schlieffers et al. |
| 6,791,580 | B1 | 9/2004 | Abbott et al. |
| 6,796,505 | B2 | 9/2004 | Pellaumail et al. |
| 6,801,223 | B1 | 10/2004 | Abbott et al. |
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,171,378 | B2 | 1/2007 | Petrovich et al. |
| 7,195,157 | B2 | 3/2007 | Swartz et al. |
| 7,385,501 | B2 | 6/2008 | Miller et al. |
| 2001/0030664 | A1 | 10/2001 | Shulman et al. |
| 2001/0040590 | A1 * | 11/2001 | Abbott et al. ............... 345/700 |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0014491 | A1 * | 1/2003 | Horvitz et al. .............. 709/206 |
| 2003/0046401 | A1 | 3/2003 | Abbott et al. |
| 2003/0126104 | A1 * | 7/2003 | Evans-Beauchamp et al. .. 707/1 |
| 2003/0154476 | A1 | 8/2003 | Abbott, III et al. |
| 2004/0201500 | A1 | 10/2004 | Miller et al. |
| 2005/0034078 | A1 | 2/2005 | Abbott et al. |
| 2005/0132045 | A1 * | 6/2005 | Hornback et al. ........... 709/225 |
| 2005/0266858 | A1 | 12/2005 | Miller et al. |
| 2005/0272442 | A1 | 12/2005 | Miller et al. |
| 2006/0019676 | A1 | 1/2006 | Miller et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |

OTHER PUBLICATIONS

John S. Breese, et al., Empirical Analysis of Predictive Algorithms for Collaborative Filtering, Proc. of 14th Conf. on Uncertainty in Artificial Intelligence, Jul. 1998, 10 pages, Morgan Kaufmann.

David M. Pennock, et al., Collaborative Filtering by Personality Diagnosis: A Hybrid Memory- and Model-Based Approach, Proc. of the 16th Conf. on Uncertainty in Artificial Intelligence, 2000, 6 pages, Morgan Kaufmann.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, Vol. 36—No. 7

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: a System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated September 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

STATISTICAL MODELS AND METHODS TO SUPPORT THE PERSONALIZATION OF APPLICATIONS AND SERVICES VIA CONSIDERATION OF PREFERENCE ENCODINGS OF A COMMUNITY OF USERS

RELATED APPLICATION

This application claims priority to U.S. Provisional Patent Application Ser. No. 60/528,597 filed on, Dec. 11, 2003 and entitled STATISTICAL MODELS AND METHODS TO SUPPORT THE PERSONALIZATION OF APPLICATIONS AND SERVICES VIA CONSIDERATION OF PREFERENCE ENCODINGS OF A COMMUNITY OF USERS, the entire contents of which are herein incorporated by reference.

TECHNICAL FIELD

The present invention relates generally to software and/or systems management and more particularly to systems and methods that analyze preference settings from a community of users to build potential settings profiles to assist new users when configuring complex computing and communications systems.

BACKGROUND OF THE INVENTION

Modern computing systems support a large number of applications serving a large number of diverse users. Even though hardware processing and memory has continued to increase in performance, software continues to outpace these advances in the number of new features that are developed to support new and existing applications. Using the cell phone as an example, many features are available for setting desired operations of the device including the type and loudness of a ring, phone directories, menu commands, inbox settings, display settings, security settings, and so forth. In addition to phone capabilities, other hardware features and associated software are beginning to appear on cell phones such as digital cameras and web services. In more complicated systems such as operating systems, software development systems, or advanced communications architectures, the number of settings to tune a particular environment to a particular user's taste or comfort level can be daunting.

In order to configure more complex systems, such as rule-based systems or statistically guided automated reasoning, according to desired preferences, users are often given the task of reading through a large digest of written material either electronic or paper and then experimenting with a system to see if the adjustments made are suitable. Such experimentation can be tedious and take more time than a user desires to invest in refining settings. As can be appreciated, this type of experimental learning process can be tedious and frustrating. In an alternative form of learning on a complex system, users are may be manually trained by another user, wherein the person supplying the training most often only conveys basic information about the system due to time constraints. Possibly worse scenarios also exist during manual training by a colleague. In these cases, the person supplying the training typically only conveys those features that are relevant to the person giving the directions. Thus, many users likely do not experience the full power and utility of a computing system and associated software.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The subject invention facilitates personalization of software applications and services. More particularly, statistical models and methods are employed to support personalization of applications and services via consideration of preference encodings of a community of users. Based upon an analysis of data from the community, potential profiles are created or suggested that users may employ as their personal settings for a system, whereby the profiles have the benefit of being selected as currently useful by the greater community of users who may also share similar features with a given user. For example, the invention mitigates problems associated with setting up conventional routing or computing systems by users that may have difficulty assessing and determining desired settings for complex systems, wherein the subject invention can employ automatic techniques such as statistical inference of a database of settings to facilitate recommendations for profile settings.

One particular aspect of the invention, in connection with profile construction and selection, considers demographics, usage, existing profiles as well as various extrinsic data that may provide for example context to a particular personalization effort. Another aspect of the invention employs inference methods in connection with personalization. For example, collaborative filtering, popularity analysis, demographic analysis, and a variety of clustering methods can be employed to analyze a database of preferences stored by a community of users to determine a potential profile or profiles of preferences that may be suitable for a given user, taking into consideration some partial information about the user or the settings. Other features can include enabling users to define properties about themselves in order to take advantage of potential settings from other users that have similar needs and performance requirements. This includes allowing direct inspection and/or selection of one or more other similar profiles from which the current profile has been synthesized. Other automated techniques include querying users with a set or subset of questions to determine another set of questions that can then be used to direct how best to configure and employ a given system. As can be appreciated, when new profile settings are selected, automated models in the system can provide predictions as to possible future system performance based upon the changed settings (e.g., if this setting is changed, you will receive 20% more medium priority messages per day).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may

BRIEF DESCRIPTION OF THE DRAWINGS

FIGS. 10-20 illustrate example profile interfaces in accordance with an aspect of the present invention.

DETAILED DESCRIPTION

Figure 1:
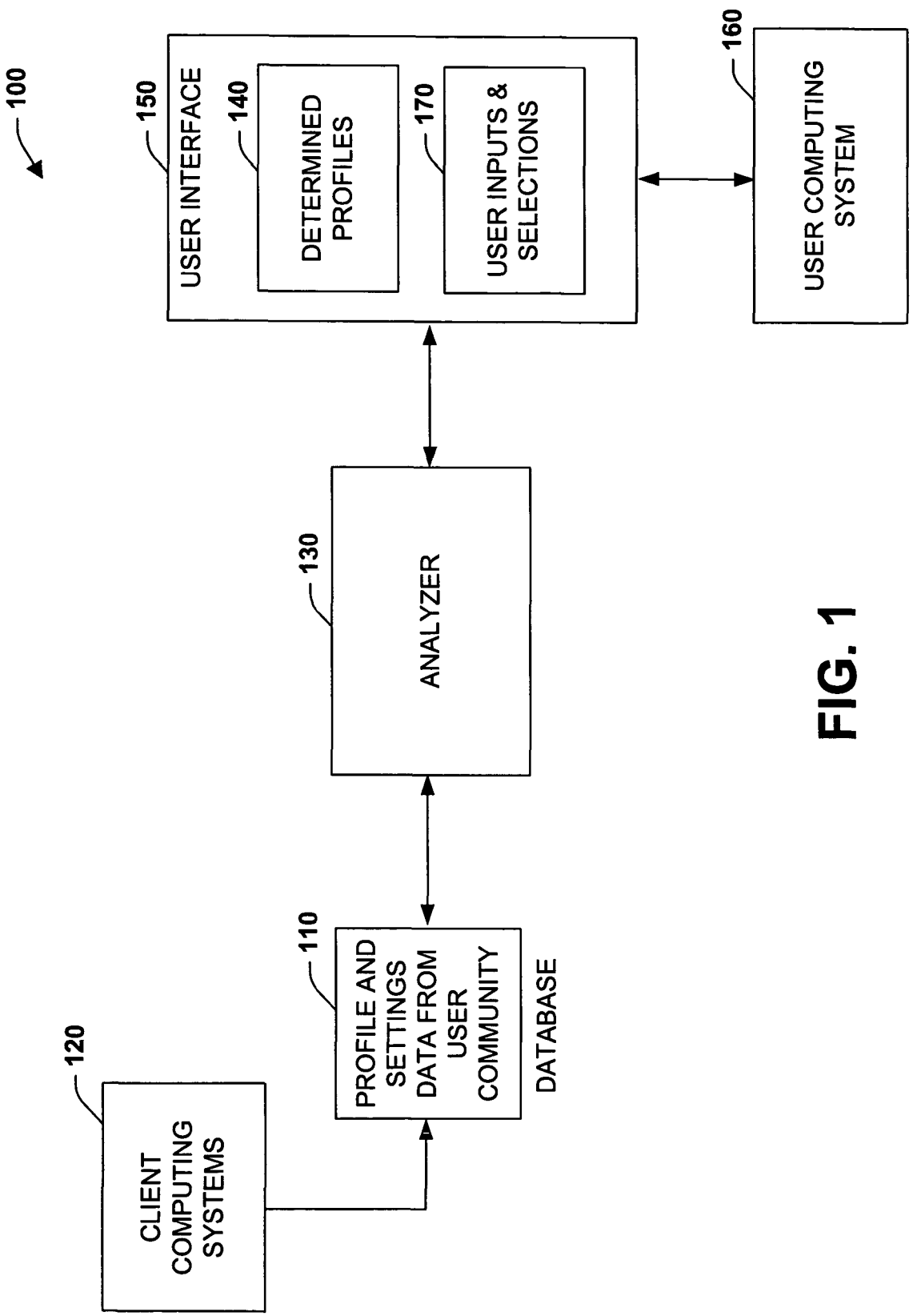
FIG. 1 illustrates a system and interface for generating personalized profiles in accordance with an aspect of the present invention.

The present invention relates to systems and methods that automatically generate potential or suggested profile settings for various computer applications. A storage component receives data relating to a community of users, whereby the data is related to profile or settings preferences of the community. An analyzer processes the community data and information relating to existing profiles in order to provide recommendations to the user in connection with building a personalized profile. The analyzer can employ various statistical and modeling techniques such as collaborative filtering to determine the personalized profile.

As used in this application, the terms "component," "model," "system," "analyzer," "builder," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Referring initially to FIG. 1, a system 100 illustrates an automated profile generator and interface in accordance with an aspect of the present invention. The system 100 includes a database 110 (or databases) that stores a plurality of profile and settings data from a user community. The profile data is generated from a plurality of client computers 120 that have generated profile settings in accordance with various applications. Such applications can include communications systems, general computing systems such as operating system settings, development system applications, and substantially any type of application whereby configuration settings are applied to customize the application according to users preferences. An analyzer 130 applies various statistical, mathematical, and/or models to the database 110 to determine one or more profiles 140 that can be displayed at a user interface 150. Such profiles 140 are automatically selected by the analyzer 140 from a plurality of factors such as from demographic or survey information supplied by a user of a client computing system 160 that may employ one or more of the generated profiles 140 for configuration or operations. The user interface 150 also includes various user inputs or selections 170 to enable the user to guide selection of a desired profile via the analyzer 130.

As noted above, the analyzer 130 can employ several techniques to process profile or settings data from the database 110. In one aspect, this can include employment of collaborative filter techniques to analyze data and determine profiles 140 for the user. Collaborative filtering systems generally use a database about user preferences to predict additional topics or products a new user might like. In accordance with the present invention, collaborative filtering is applied by the analyzer 130 to process previous system settings preferences of users to predict likely or possible settings or profiles for new users of a system. Several algorithms including techniques based on correlation coefficients, vector-based similarity calculations, and statistical Bayesian methods can be employed.

One task in collaborative filtering is to predict the utility of items to a particular user (the active user) based on a database of user votes (express or implied) from a sample or population of other users (the user database 110). Memory-based algorithms operate over the entire user database to make predictions. In Model-based collaborative filtering, in contrast, employs the user database to estimate or learn a model, which is then used for predictions. Beyond distinct memory-based and model-based methods, combination methods have been developed. For instance, a collaborative filtering method called personality diagnosis (PD) can be employed that can be seen as a hybrid between memory- and model-based approaches. All data is maintained throughout the process, new data can be added incrementally, and predictions have meaningful, probabilistic semantics. Each user's reported preferences are interpreted as a manifestation of their underlying "personality type." It is assumed that users report ratings for an item with Gaussian error. Given the active user's known ratings of items, the probability can be computed that he or she has the same personality type as every other user, and then compute the probability that he or she will desire some new item. PD retains some of the advantages of both memory- and model-based algorithms, namely simplicity, extensibility, normative grounding, and explanatory power.

Collaborative filtering systems may be distinguished by whether they operate over implicit versus explicit votes. Explicit voting refers to a user consciously expressing his or her preference for a title, usually on a discrete numerical scale. Implicit voting refers to interpreting user behavior or selections to impute a vote or preference. Implicit votes can based on browsing data (for example in Web applications), purchase history (for example in online or traditional stores), or other types of information access patterns such as from the database of 110 that stores previously selected or currently used preference settings from the systems 120.

Generally, the task in collaborative filtering is to predict the votes of a particular user (referred to as the active user) from a database of user votes from a sample or population of other users. In memory based collaborative filtering algorithms, the votes of the active user are predicted based on some partial information regarding the active user and a set of weights calculated from the user database. In the field of information retrieval, the similarity between two documents is often measured by treating each document as a vector of word frequencies and computing the cosine of the angle formed by the two frequency vectors.

From a probabilistic perspective, the collaborative filtering task can be viewed as calculating the expected value of a vote, given what is known about the user. For the active user, it is desired to predict votes on as yet unobserved items. One plausible probabilistic model for collaborative filtering is a Bayesian classifier where the probability of votes are conditionally independent given membership in an unobserved class variable C taking on some relatively small number of discrete values. The concept is that there are certain groups or types of users capturing a common set of preferences and tastes. Given the class, the preferences regarding the various items (expressed as votes) are independent. The probability model relating joint probability of class and votes to a tractable set of conditional and marginal distributions is the standard "naive" Bayes formulation.

An alternative model formulation for probabilistic collaborative filtering is a Bayesian network with a node corresponding to each item in the domain. The states of each node correspond to the possible vote values for each item. A state corresponding to "no vote" for those domains is also included where there is no natural interpretation for missing data. An algorithm is then applied for learning Bayesian networks to the training data, where missing votes in the training data are indicated by the "no vote" value. The learning algorithm searches over various model structures in terms of dependencies for each item. In the resulting network, each item will have a set of parent items that are the best predictors of its votes. Each conditional probability table can be represented by a decision tree encoding the conditional probabilities for that node.

Before proceeding, it is noted that the user interface 150 can be provided as a Graphical User Interface (GUI). For example, the interface 1500 can include one or more display objects (e.g., icon) that can include such aspects as configurable icons, buttons, sliders, input boxes, selection options, menus, tabs and so forth having multiple configurable dimensions, shapes, colors, text, data and sounds to facilitate operations with the systems described herein. In addition, the user inputs 170 can also include a plurality of other inputs or controls for adjusting and configuring one or more aspects of the present invention. This can include receiving user commands from a mouse, keyboard, speech input, web site, browser, remote web service and/or other device such as a microphone, camera or video input to affect or modify operations of the various components described herein.

Figure 2:
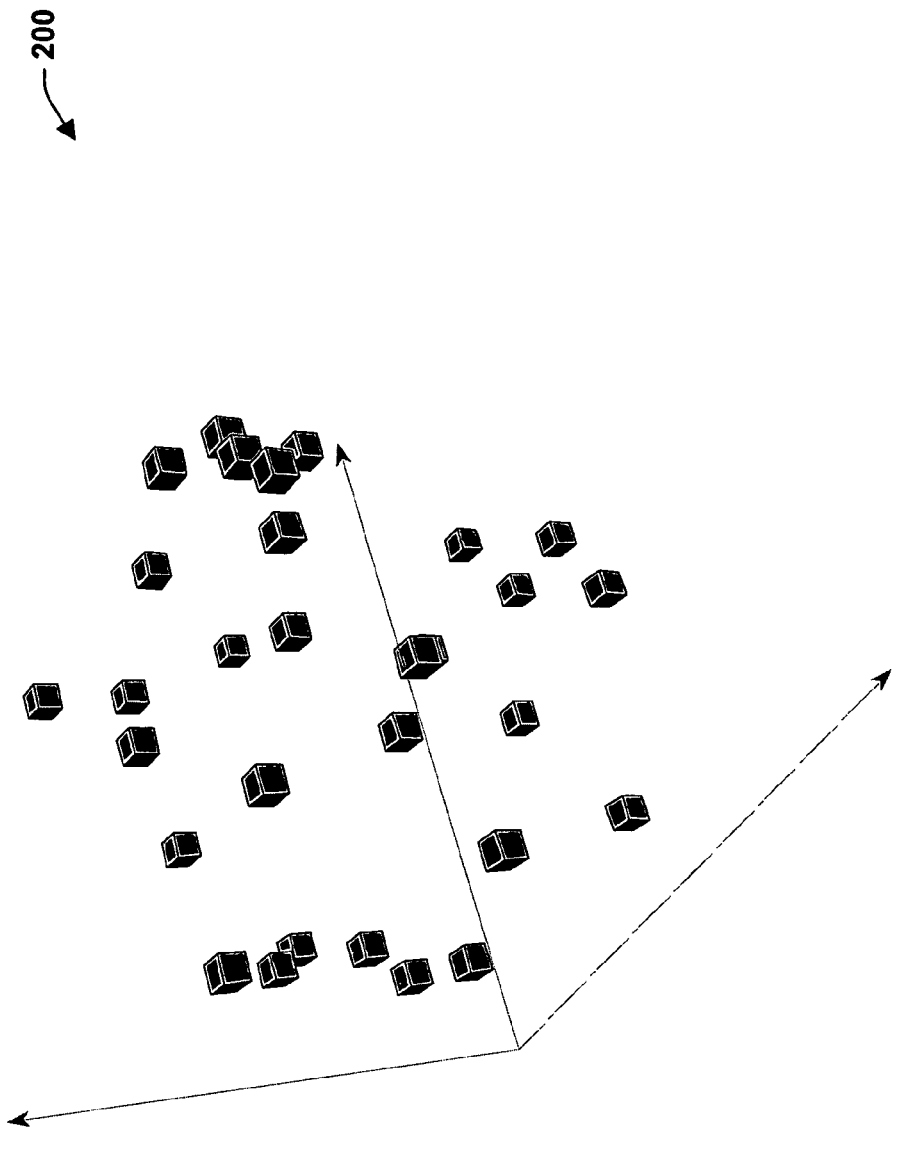
FIGS. 2-3 illustrate example collaborative filtering diagrams in accordance with an aspect of the present invention.
Figure 3:
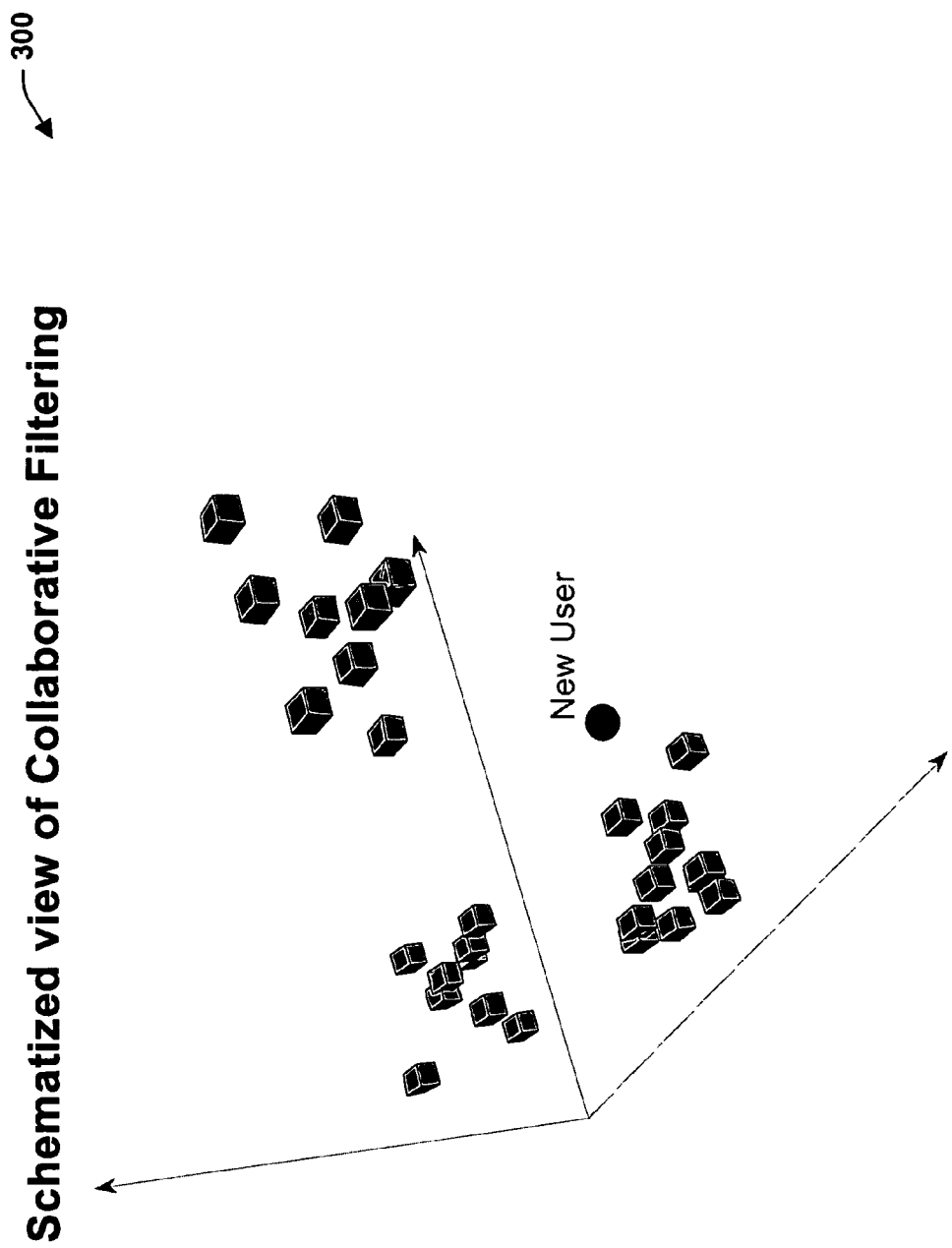

Referring now to FIGS. 2-3, example collaborative filtering diagrams are presented in accordance with an aspect of the present invention. FIG. 2 is a diagram 200 that shows preference data spread evenly in a three-dimensional space. However, rather than being spread evenly in a multi-attribute space of preferences, users are often similar in different ways to other users.

In FIG. 3, a diagram 300 illustrates a more representative form of data. In many cases, people have similar preferences to other people and people can be grouped into clusters based on similarity in a multidimensional space. The subject invention can employ machine learning and inference techniques or simpler statistical clustering methods, to reason about the likelihood that a user with some preferences or demographic information would agree with other previously unspecified settings or preferences.

This type of service or application is broadly referred to as "collaborative filtering." In one aspect, the present invention focuses on the application of collaborative filtering for the general case of identifying software settings, and more specifically for identifying preferences about context-sensitive computing, in particular for the definition of the cost of interruption in different settings, with an application in communications in one specific example. However, as noted above, the subject invention can be applied to substantially any type of electronic system that employs settings for configuration and operations. The following examples although framed in many cases in terms of a communications system should not be considered as limiting the present invention to communications systems. For example, some of the following systems describe a "Bestcom" communications system that employs selected preferences of contactors and contactees to deliver electronic communications via the "best" or most likely means for establishing communications between parties in view of the preferences.

Figure 4:
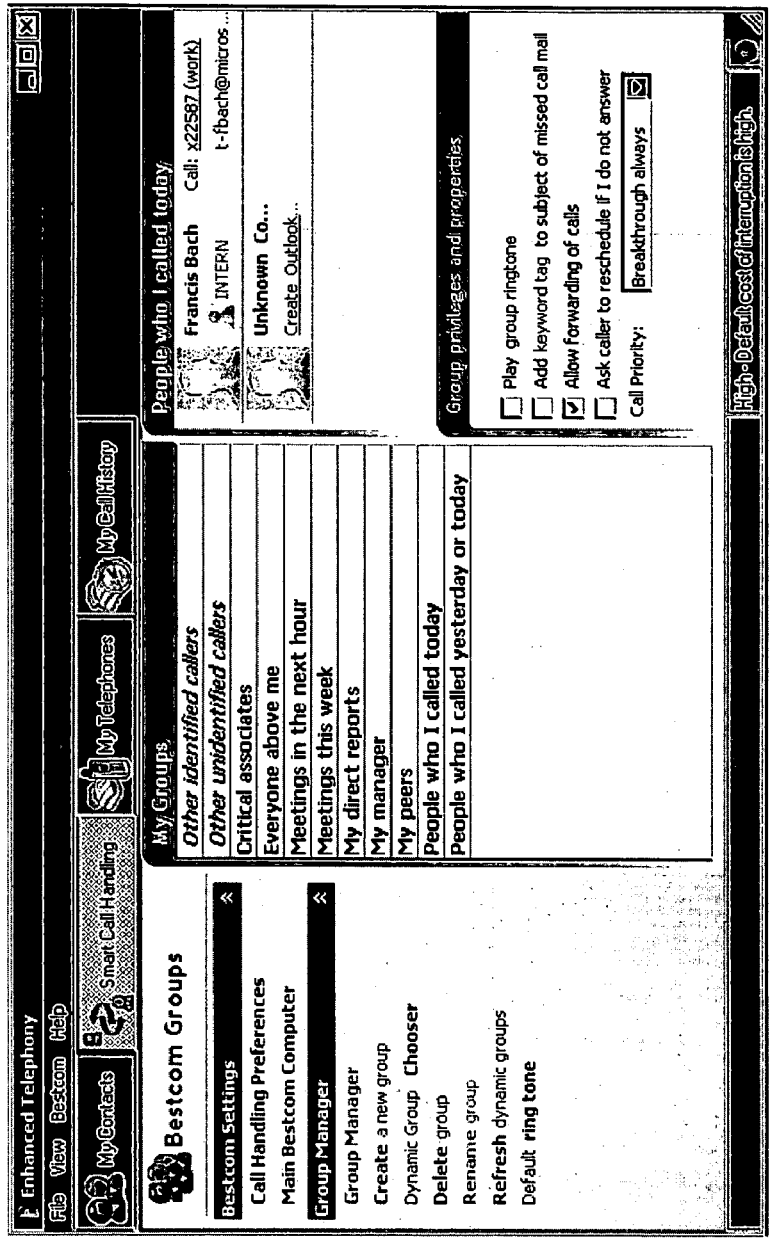
FIGS. 4-8 illustrate example cost benefit concepts, interruption concepts, and user interfaces in accordance with an aspect of the present invention.

Turning to FIG. 4, a communications prototype interface 400 is illustrated in accordance with an aspect of the present invention. As noted above, Bestcom systems employ best means communication methods based upon preferences of contactees and contactors. A Bestcom prototype is depicted as the interface 400 and has been used to explore formal use of expected utility as well as control via the specification of high-level cost-benefit rules. Considering cost-benefit rules control, the communications system and interface 400 considers context, including time of day and day of week, as well as the call priority (which can be interpreted as the cost of deferring a call) of individuals and groups of people. This interface 400 shows a group manager, showing people, grouped by organization and activity, including such groups as meeting in one hour from now, people whom I called today, and so forth.

Figure 5:
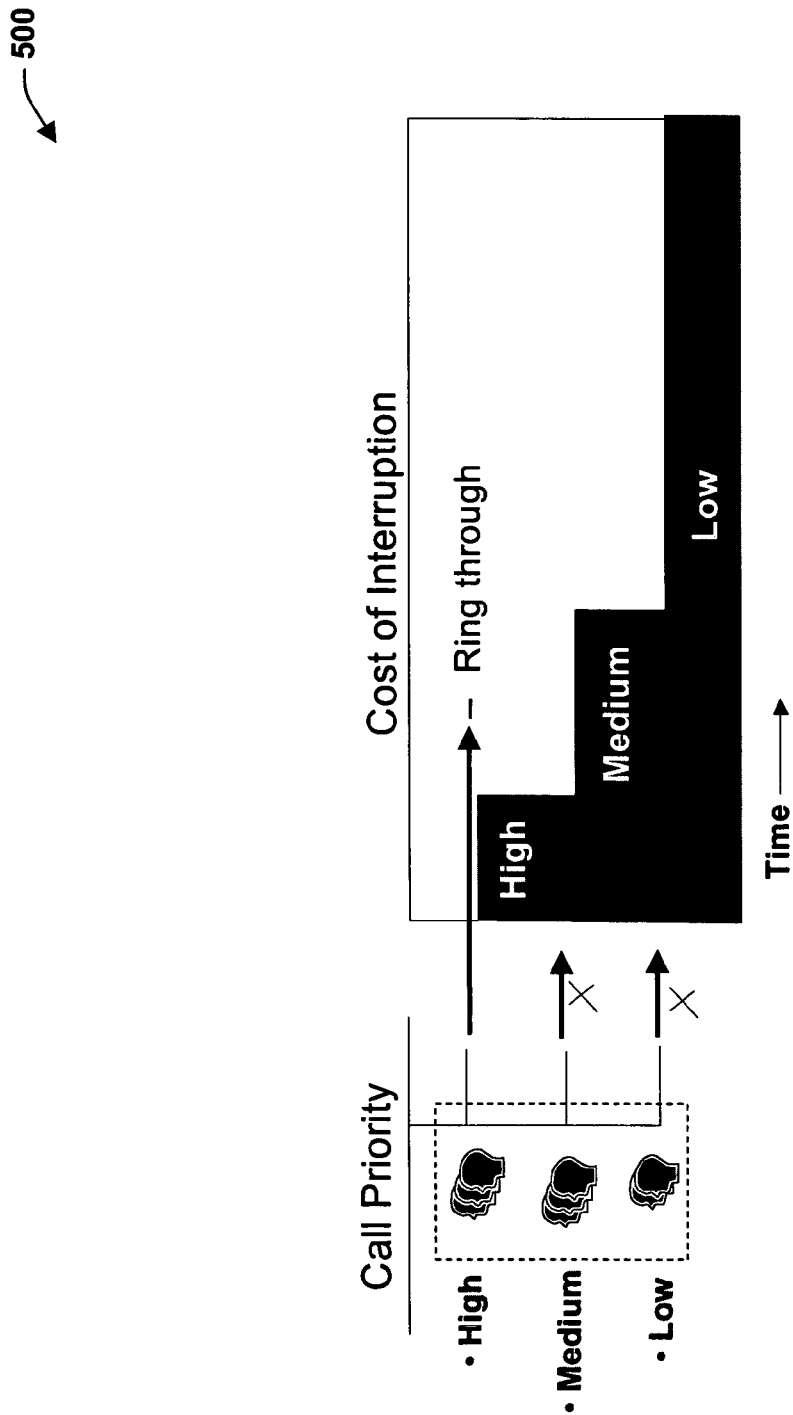

Proceeding to FIG. 5, a diagram 500 depicts how prioritized calls or messages are routed to a receiver of the messages over time and in view of the cost of interruption of the prioritized messages. The high-level cost-benefit version of the communications system allows calls to be routed through to users, even when they are in a mobile setting, but considering the current, dynamically changing cost of interruption, based on meetings, sensed observations (such as a microphone and conversation analysis system picking up conversation), and desktop activities (e.g., what is the user doing now), and settings, such as what is the user's Instant Messenger status set up to report (busy, away, etc.).

One concept with the metaphor depicted in the diagram 500 is that people break through to those that have a priority (low, medium, and high) that is as high or higher than the cost of interruption. According to this example of routing prioritized messages in accordance with preferences, collaborative filtering for software settings can be applied. It is to be appreciated that collaborative filtering techniques can apply to many scenarios and applications where people can configure software or other systems based on preferences. Thus, an architecture can be constructed that can take information about settings from multiple users and then analyze the settings to build systems that can assist single users with setting up their preferences. Demographic information can be used if it is available as another input along with other factors that are described below.

Figure 6:
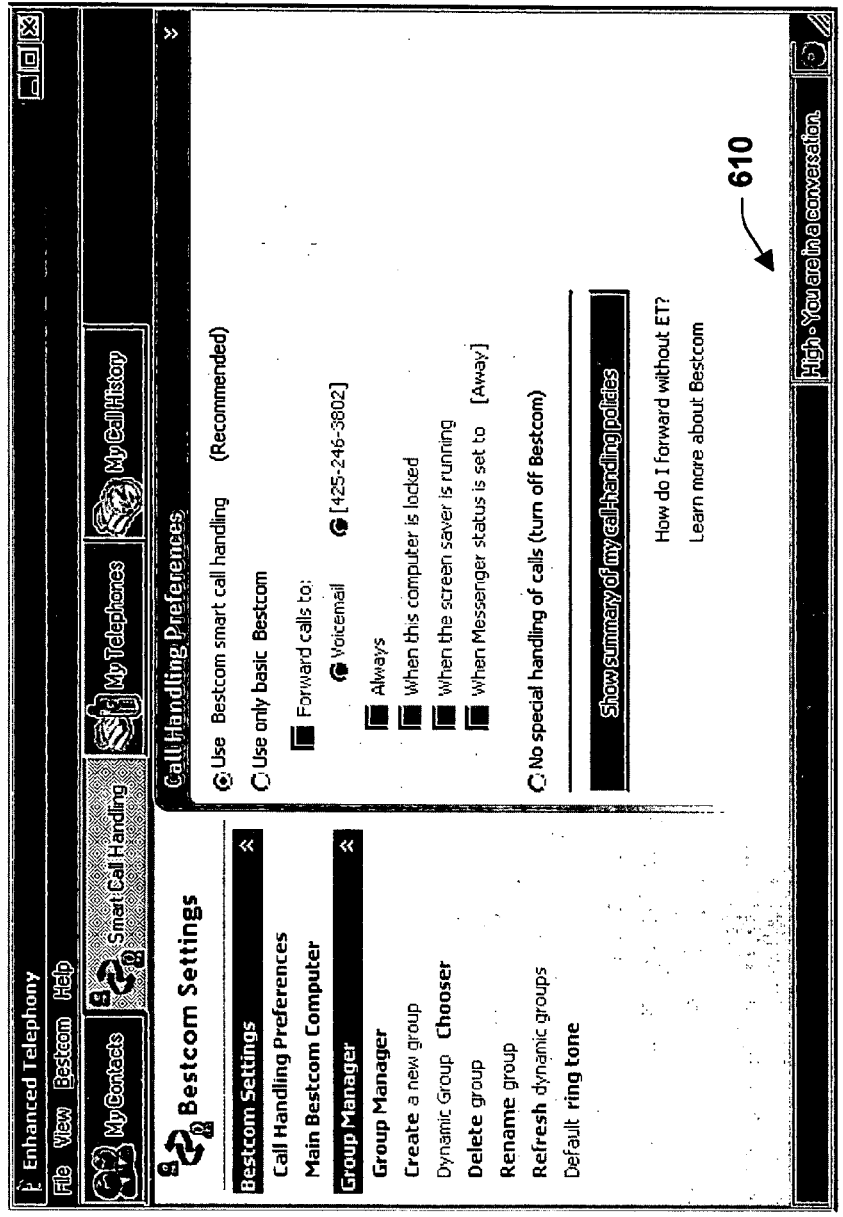
Figure 7:
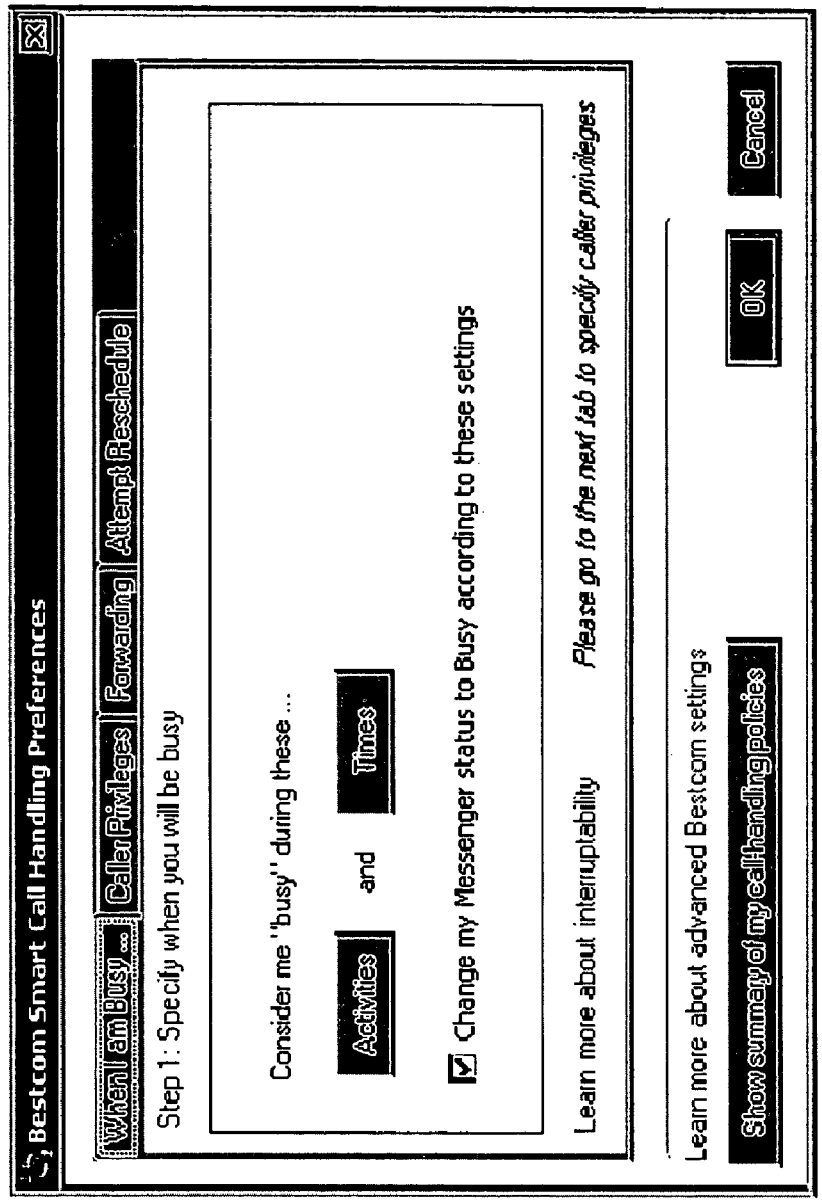

Referring briefly to FIG. 6, an interface 600 is illustrated. In this case, a cost-benefit system can be set up by specifying caller priorities and also the cost of interruption in different settings. For the example interface 600, users enter a preference specification view. Note, that the current context sensed by the system and the cost of interruption is indicated in the lower right-hand corner of the interface at 610. Referring briefly to FIG. 7, an interface 700 is depicted that enables users to specify activities and times when they are considered busy. In this example, users can specify when they are in a low, medium, or high cost of interruption state, by time and/or activities. Although the focus of the following description is on activities, the associated methods can apply broadly to any settings and/or systems.

Figure 8:
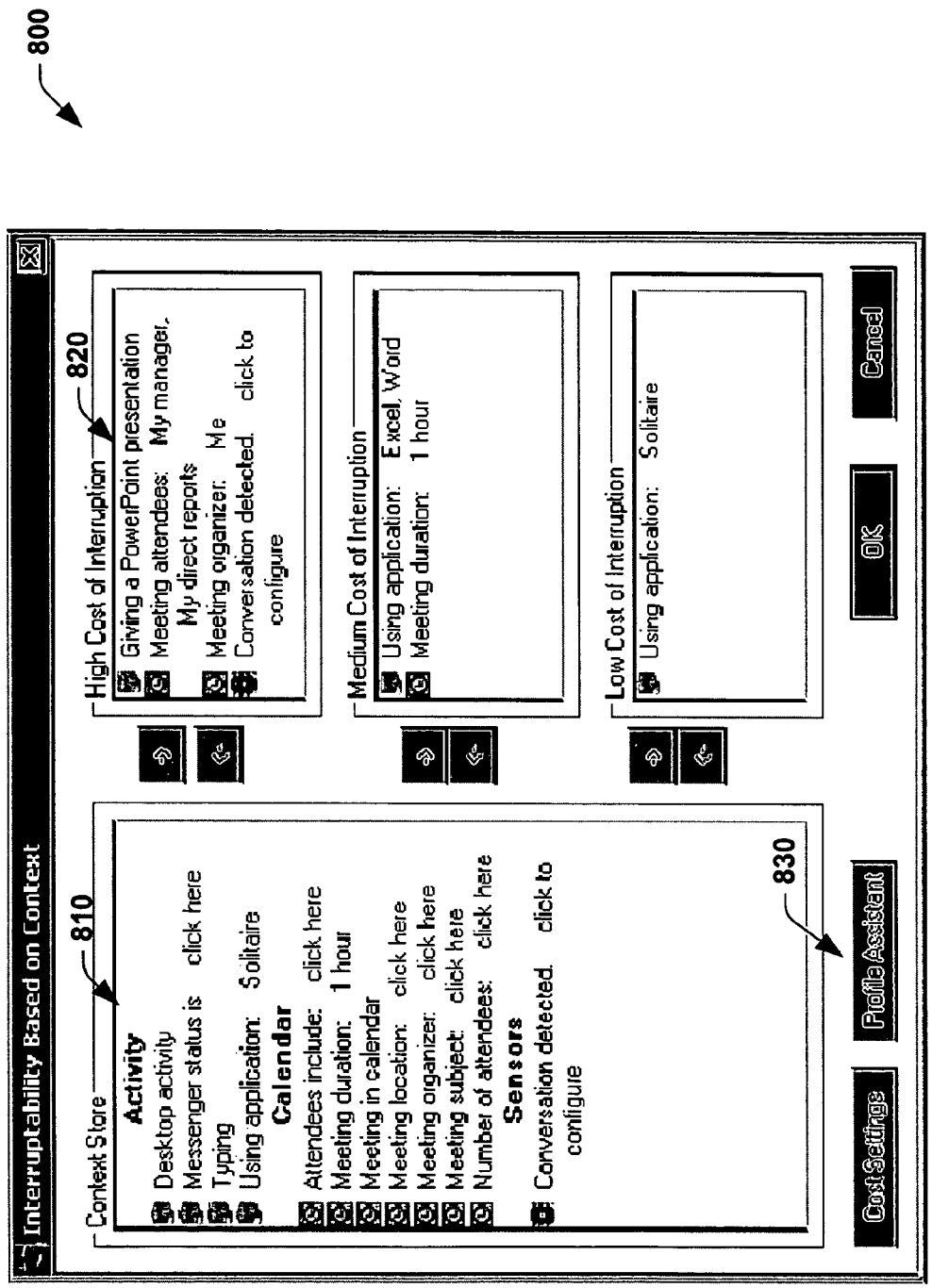

FIG. 8 illustrates an interface 800 for defining varying context states and associated cost of interruptions for various user states. In this example, an activity selector 810 allows users to select and parameterize observations, from categories of activities, calendar, and sensors. Activities refer to desktop computing activities (application in focus and actively in use) or settings (e.g., Messenger). Calendar refers to properties about meetings in progress. Sensors refer to acoustical and visual sensing, and other multi-modal sensing.

With this particular sample interface 800 running as part of a client-side telephony application, that is in communication with a server, a user can select, parameterize, and drag items into high, medium, and low cost of interruption folders at 820. A set of items indicates a boolean or'ing of the distinctions; when any of the distinctions is active in a category, the category becomes true. The system reports back the highest cost category that is activated by the status of the distinctions in the category. In building this system, an example architecture was created that stores the preference settings of users on a centralized server however, distributed or web-based servers can also be employed.

In this example, the subject invention employs preference encodings for the control of cost-benefit—centric communications system, to develop a preference recommendation system that considers the preferences and backgrounds of multiple users to create a profile assistant. Users can access the profile assistant by clicking on the Profile Assistant button 830. The Profile Assistant button takes the users from a client-side preference assessment application to a web service that runs inference to perform collaborative filtering, as well as statistical summaries of user preferences in the community of users, to provide a preference-assessment assistant service. Profile assistant interfaces activated from the button 830 are described in more detail below with respect to FIGS. 10-20.

Figure 9:
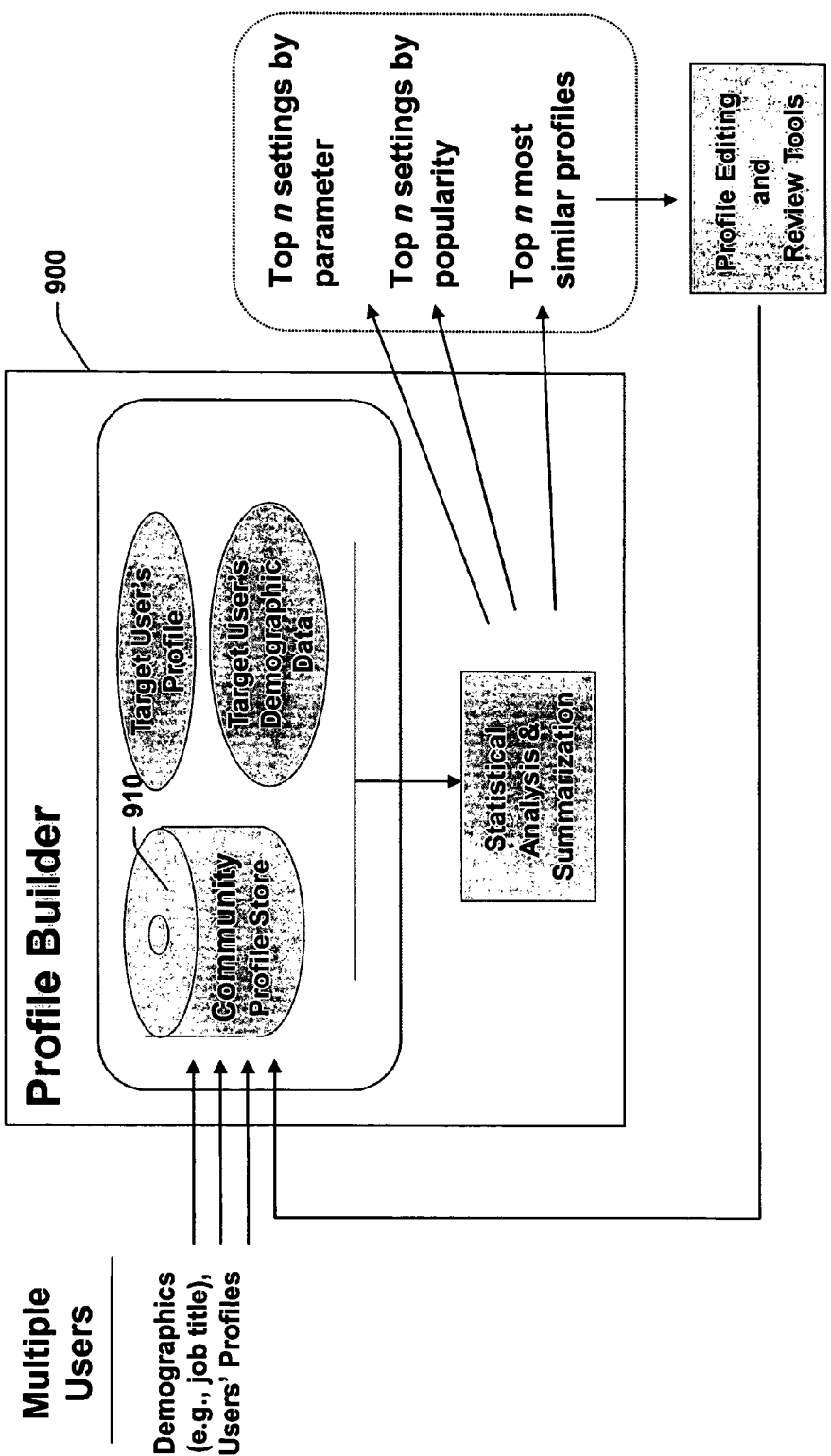
FIG. 9 is a block diagram of a profile builder in accordance with an aspect of the present invention.

FIG. 9 is a block diagram of a profile builder 900 in accordance with an aspect of the present invention. The profile builder 900 can receive data regarding a plurality of users, and stores respective community profiles for these users in a community store 910. The profile builder 900 can leverage off of these completed and/or partially completed profiles in connection with building new profiles for users (new and/or existing). Data regarding a user that desires to build a new profile is employed in connection with the community profiles to facilitate the user building a personalized profile. Various statistical and/or probabilistic schemes can be employed, for example, to identify to the user top n settings by particular parameter(s), top m settings by popularity, top x most similar profiles to facilitate the user selecting most appropriate sub-profiles as part of a personalized profile building effort.

The profile builder 900 can be employed with a profile editor provides for selecting from a plurality of states (e.g., activities, calendar . . . ), and for using such selected states in connection with building a personal profile. Additionally, a profile assistant can provide recommendations based at least in part upon community profiles via any of a plurality of suitable metrics (e.g., recommendations, similarity between current user and a subset of users represented in the community profiles, popularity of particular settings (e.g., given context). As can be appreciated, the subject invention substantially facilitates personalized profile building by leveraging off of existing profiles. More particularly, the invention takes into consideration that a large percentage of individuals may have coincident preferences with respect to profile setting for particular states; and by identifying correlations among subsets of individuals recommendations as to profile settings can be provided to an individual to stream-line as well as enhance personalized profile building.

Figure 10:
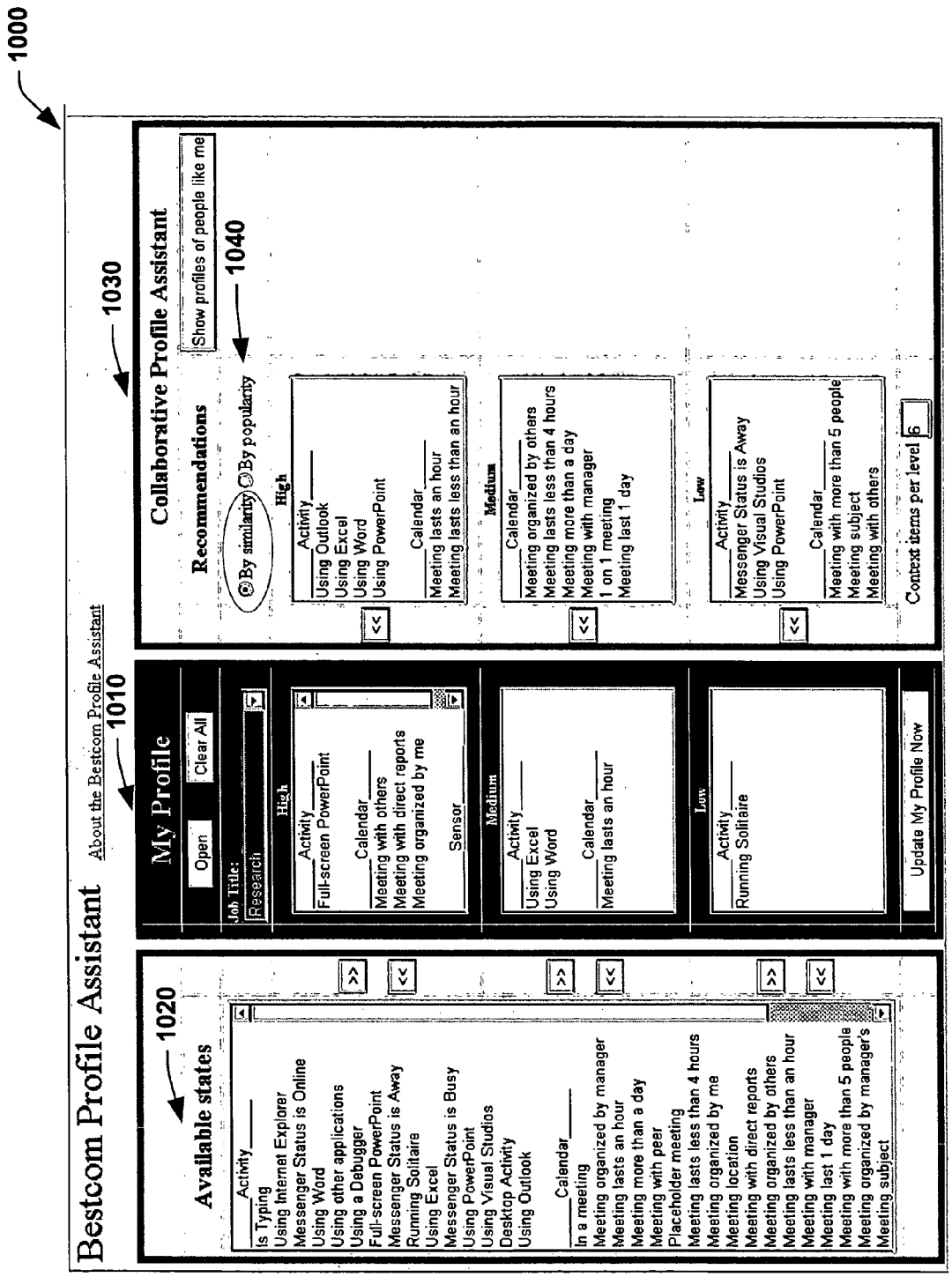

FIGS. 10-20 illustrate example profile interfaces in accordance with an aspect of the present invention. With reference to FIG. 10, a view of the web service interface 1000 is illustrated. My Profile at 1010 is populated with the current settings that has been input to client software, as well as sample demographic information (in this case, organizational role). Available observations are listed by category on the left of My Profile at 1020. Collaborative Filtering is employed to the right of the column at 1030, and displays settings that one may like to include in the definition of low, medium, and high cost of interruption, based on the settings that have already been placed there by an example user. Any distinctions in the recommendations column of 1030 can be selected and moved into My Profile at 1010. Beyond looking at inferences, users may desire to inspect settings by popularity. By selecting "By Popularity" at 1040 users can now see a listing by popularity, shown on FIG. 11.

Figure 11:
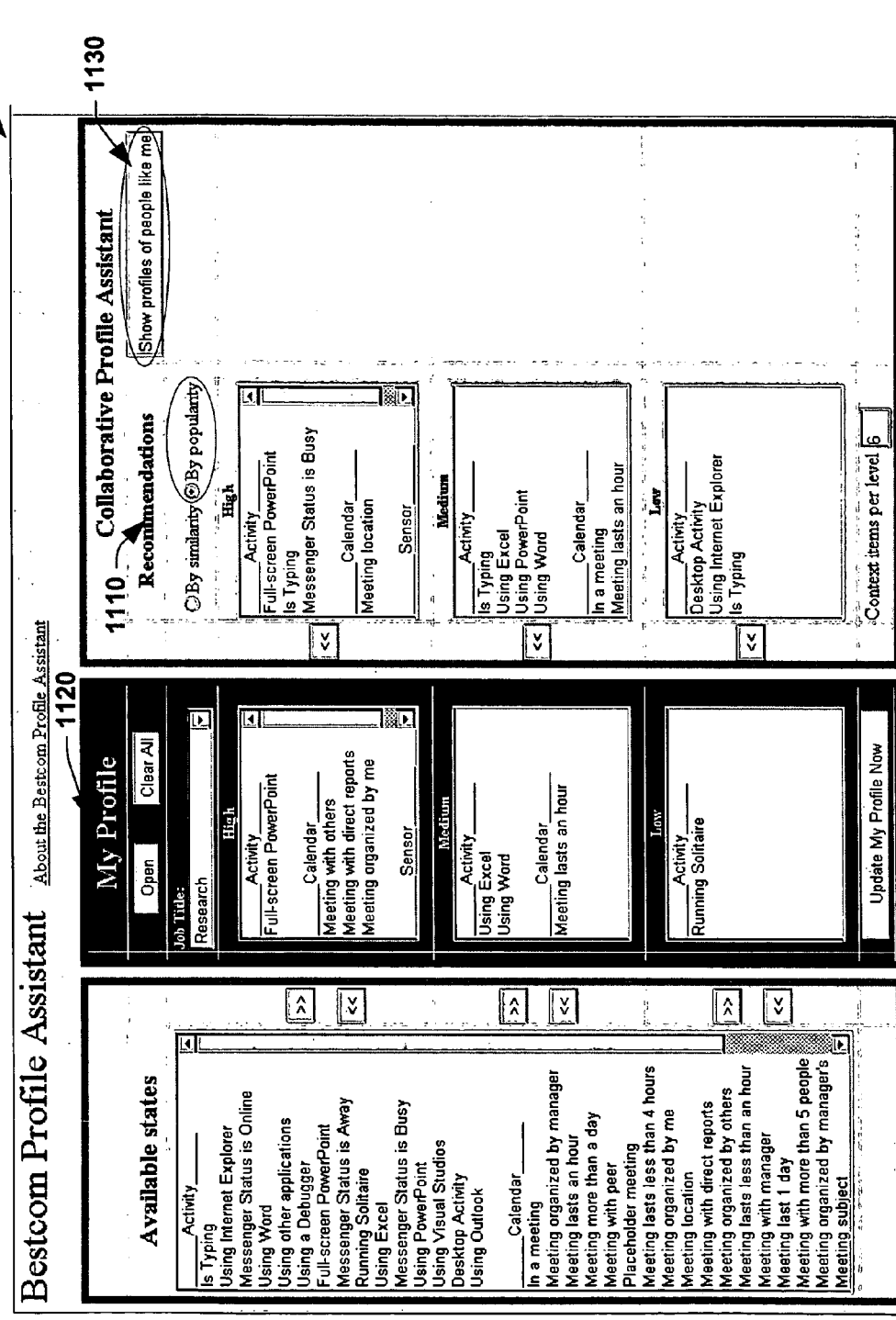

Referring to FIG. 11, an interface 1100 depicts a view by popularity. Again, users can select and move observations from a Recommendations column 1110 into a My Profile column at 1120. Another powerful feature of inference is illustrated, in this case, visiting other people by similarity. By selecting a "Show Profiles of People Like Me" button 1130, users can view people who are most like them, both in terms of what they have said about how they define low, medium, and high cost of interruption, and, if available, their organizational role or job title. Such demographics could include other properties, like age, sex, years at a company, number of calls received per day, and so forth.

Figure 12:
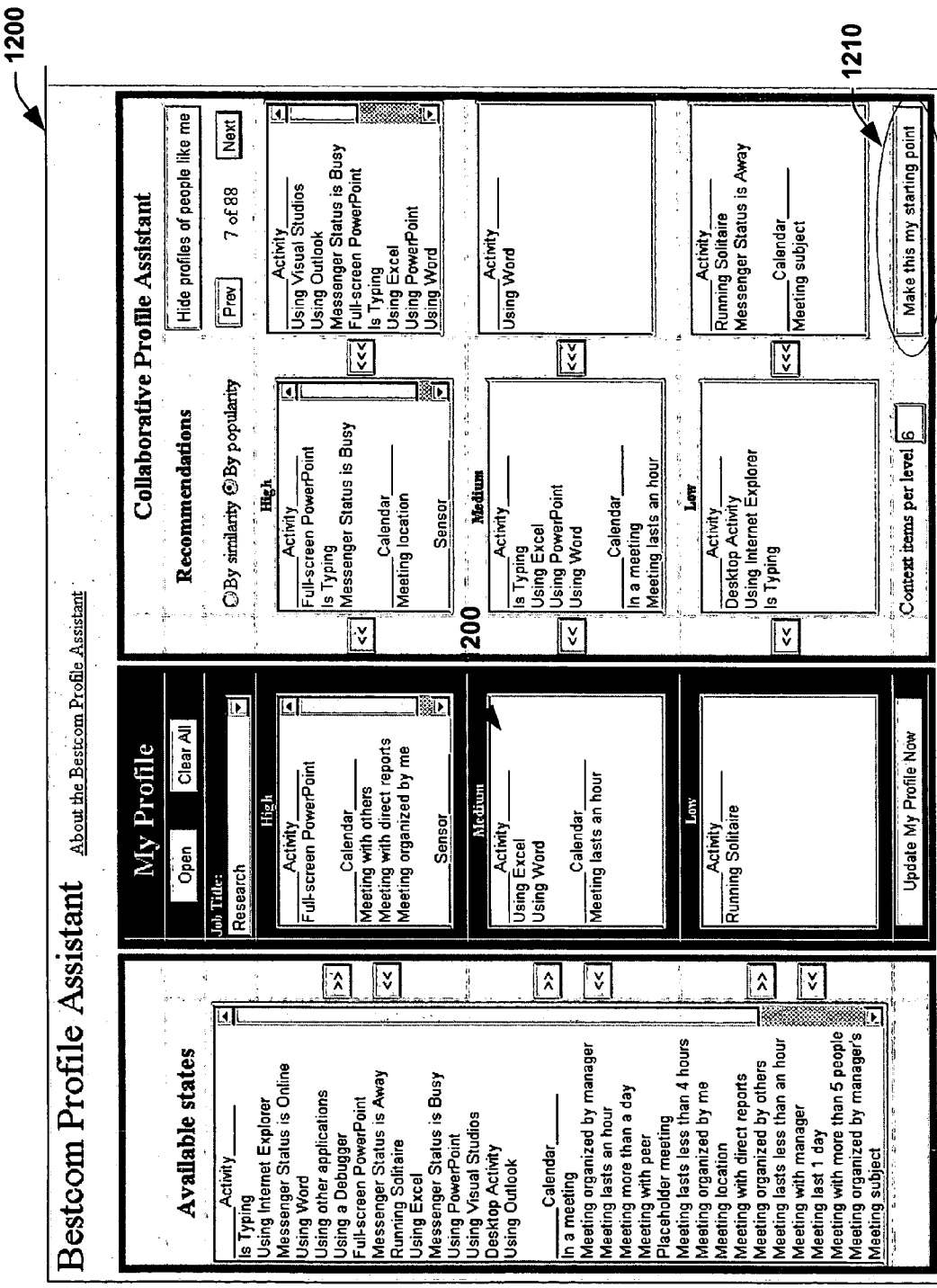
Figure 13:
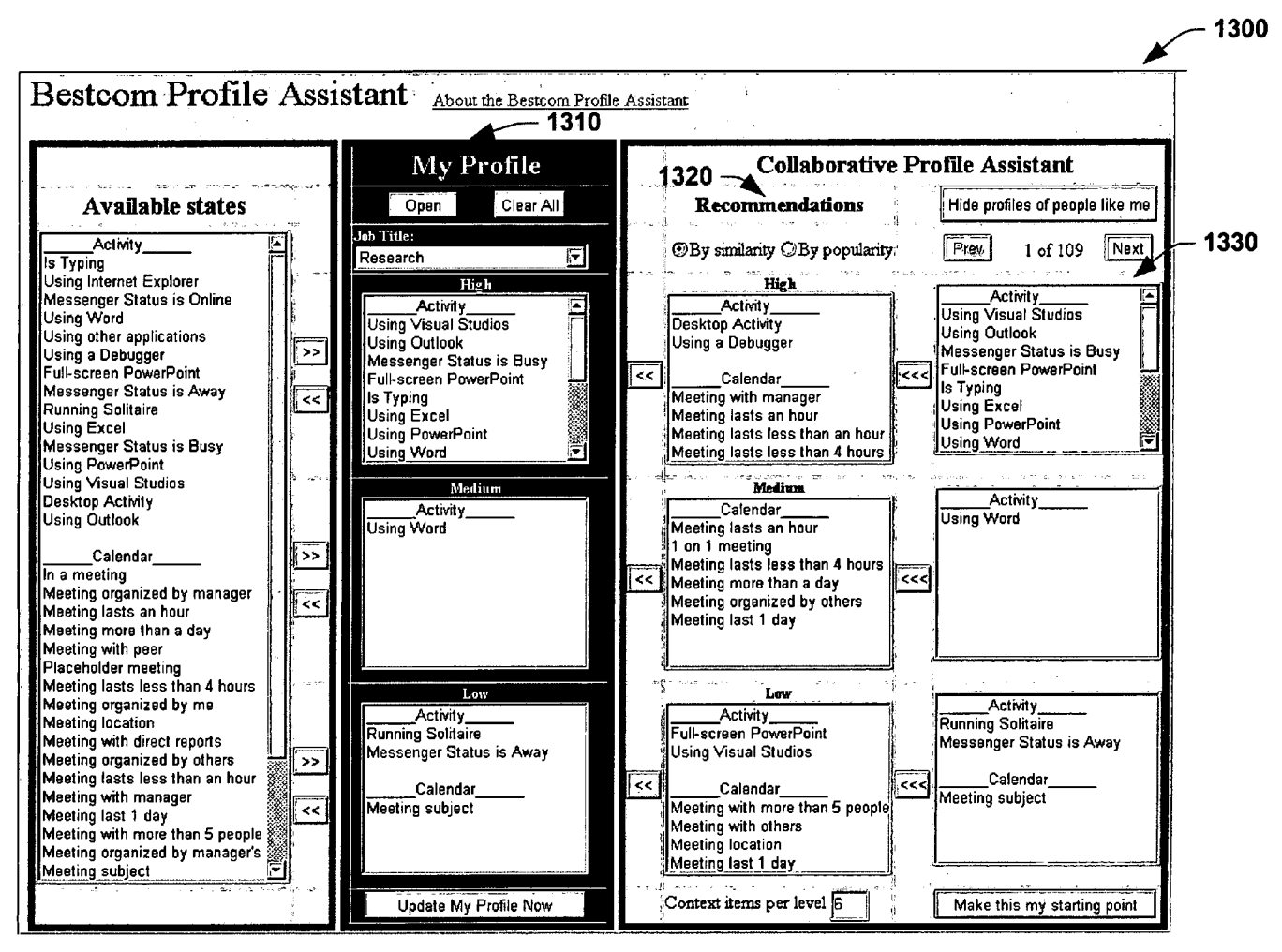

Referring to FIG. 12, an interface 1200 illustrates turning on view profiles of similar people column at 1130 of FIG. 11, actual anonymized profiles are displayed that are most similar to the current user's profile and demographics. In this case 88 profiles are above a similarity threshold for display. The user can peruse actual existing user-crafted profiles for multiple users. These are ordered from the most similar to less similar profiles in the community of users of this application. In this case, the user has selected profile number 7 out of 88 total available over threshold as interesting. The user can pick specific observations by selecting the observations or can click on the "Make this My Starting Point" button at 1210. Making this selection 1210 loads in the entire profile and replaces the user's previous settings. With the new profile of FIG. 12 being selected at 1210, the My Profile settings are updated as depicted in the interface 1300 of FIG. 13 at 1310. Recommendations for extension of the definitions are updated via collaborative filtering inference at 1320, and the list of similar profiles is also resorted and thresholded at 1330. The user can continue to refine their own profile and save it out, if desired. When the user is finished, they can save the profile and the settings as they appear in his or her client software settings.

Figure 14:
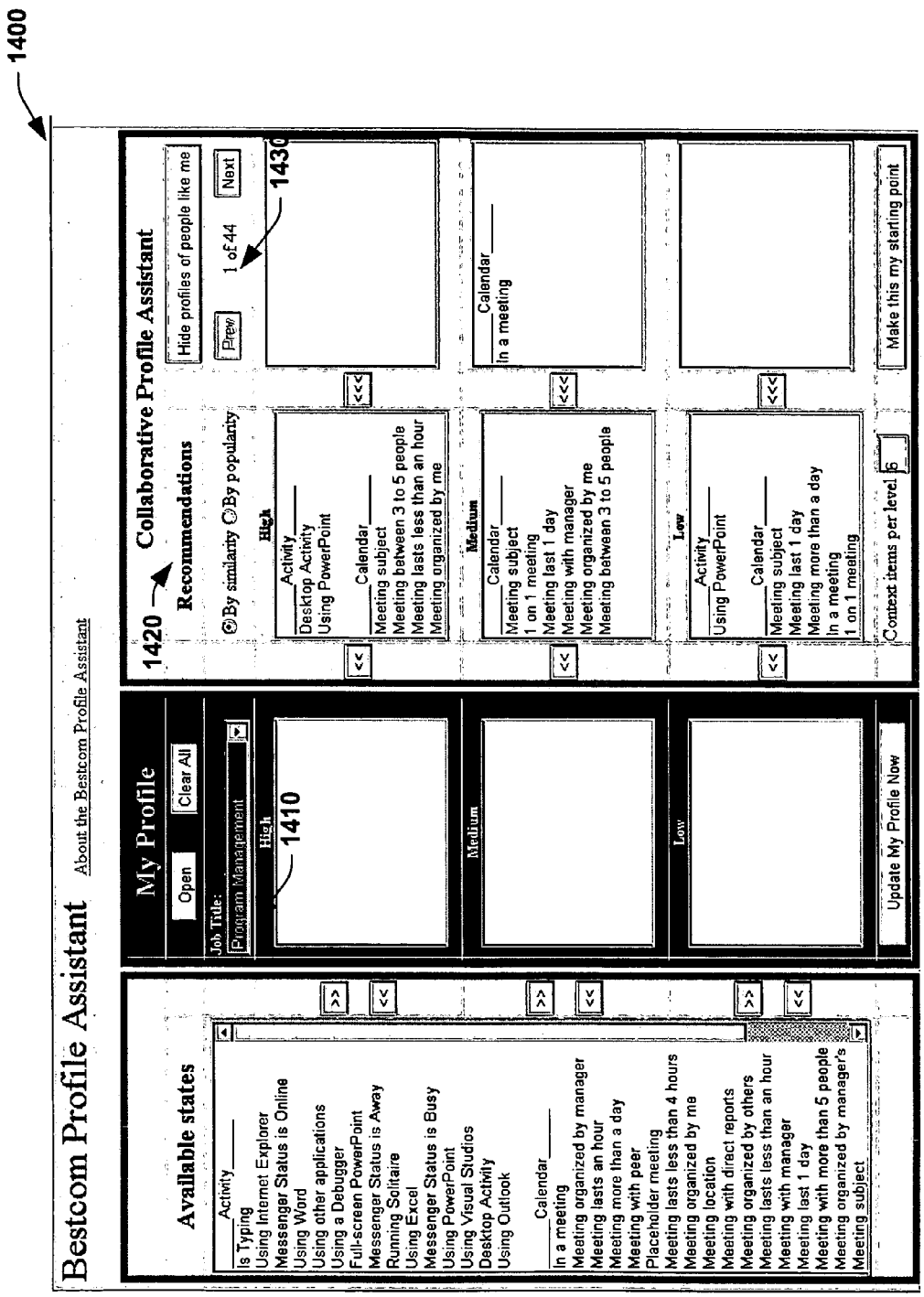

Referring to FIG. 14, an interface 1400 is illustrated whereby a user is at a starting point having no prior preference assessments. The view 1400 depicts when a user starts with a clean slate, and indicates (selects or inputs option) that the user is a Program Manager at the organization at 1410. Recommendations from the collaborative filtering system are displayed under recommendations at 1420. Similar profiles are also indicated at 1430.

Figure 15:
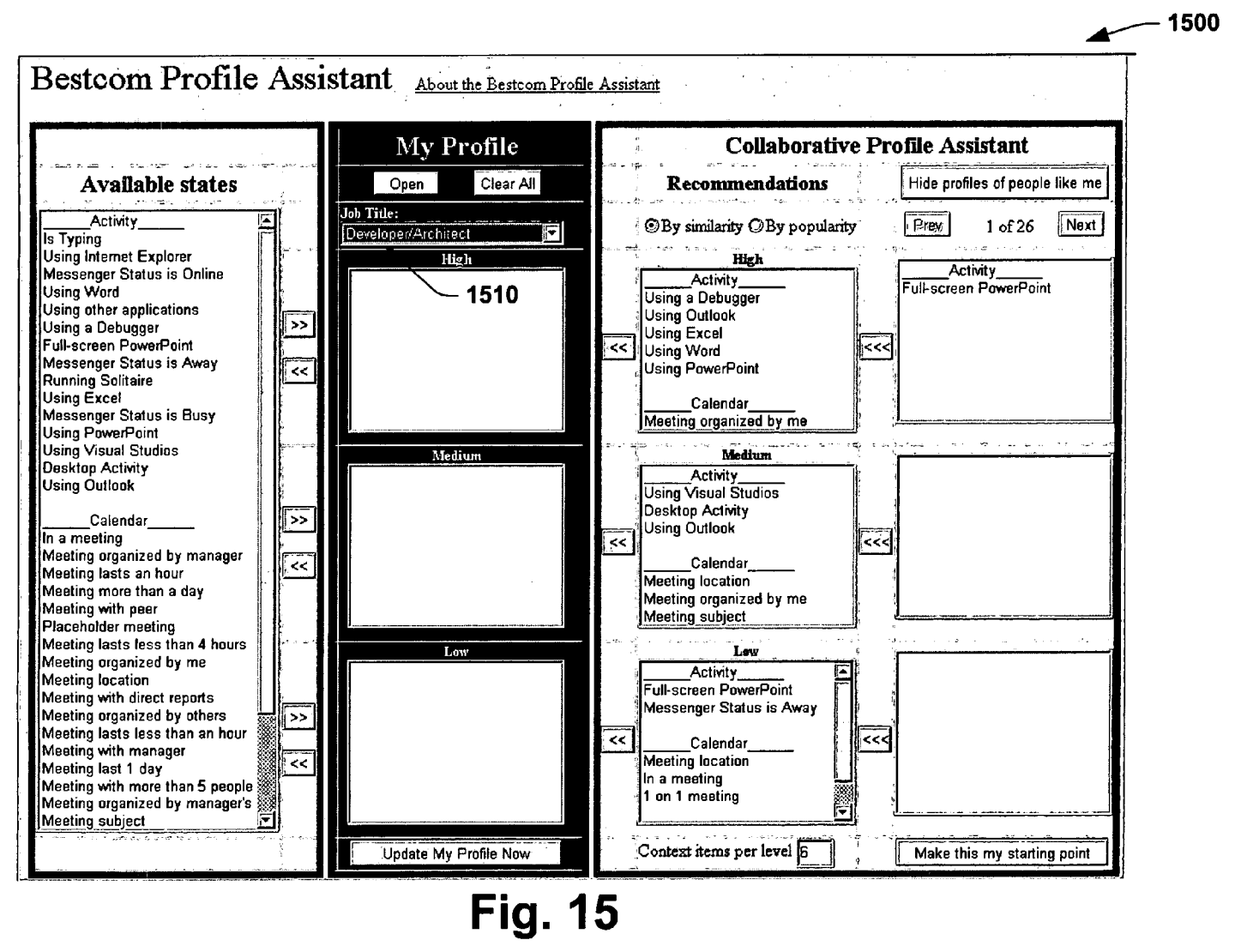
Figure 16:
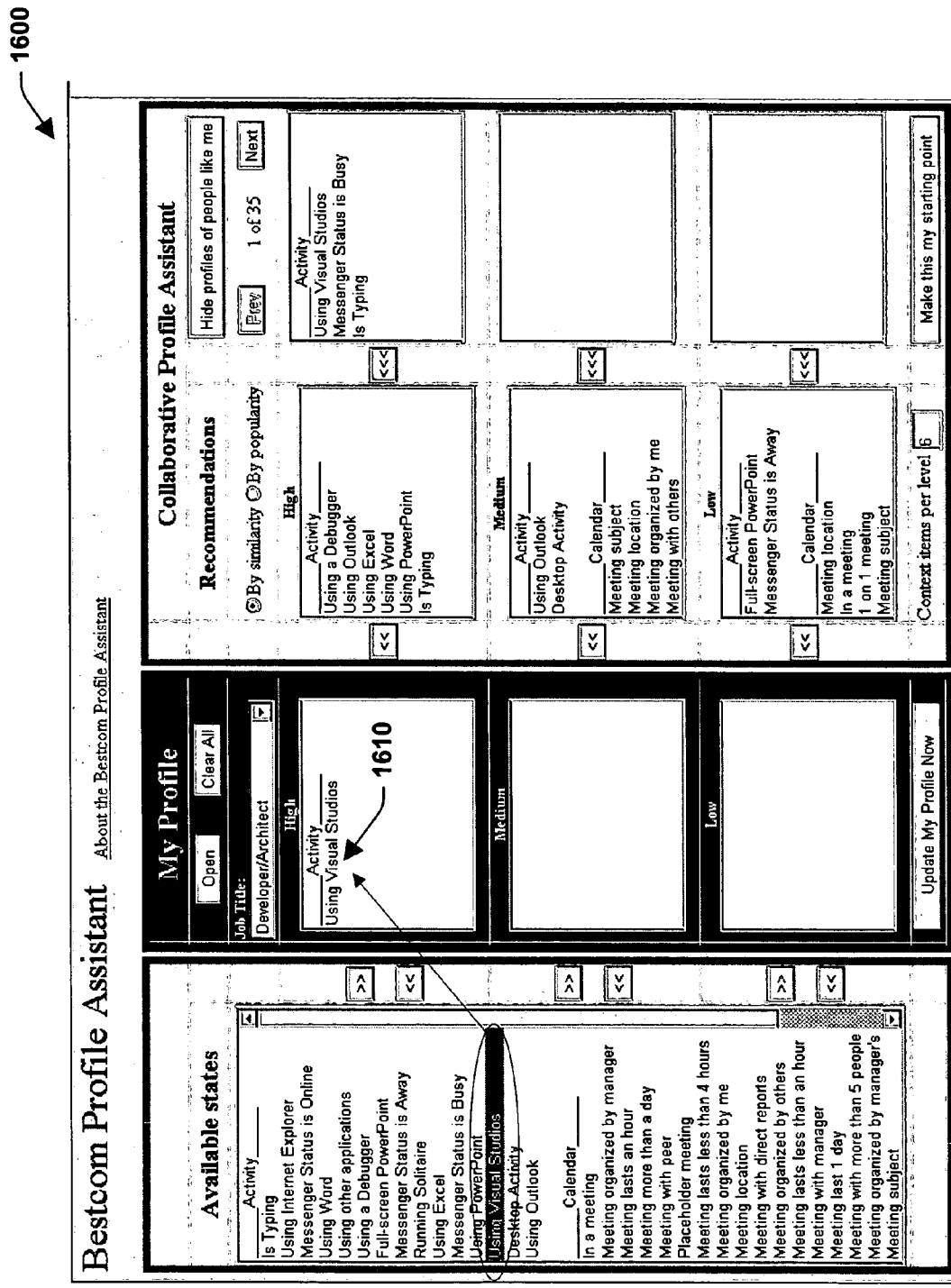
Figure 17:
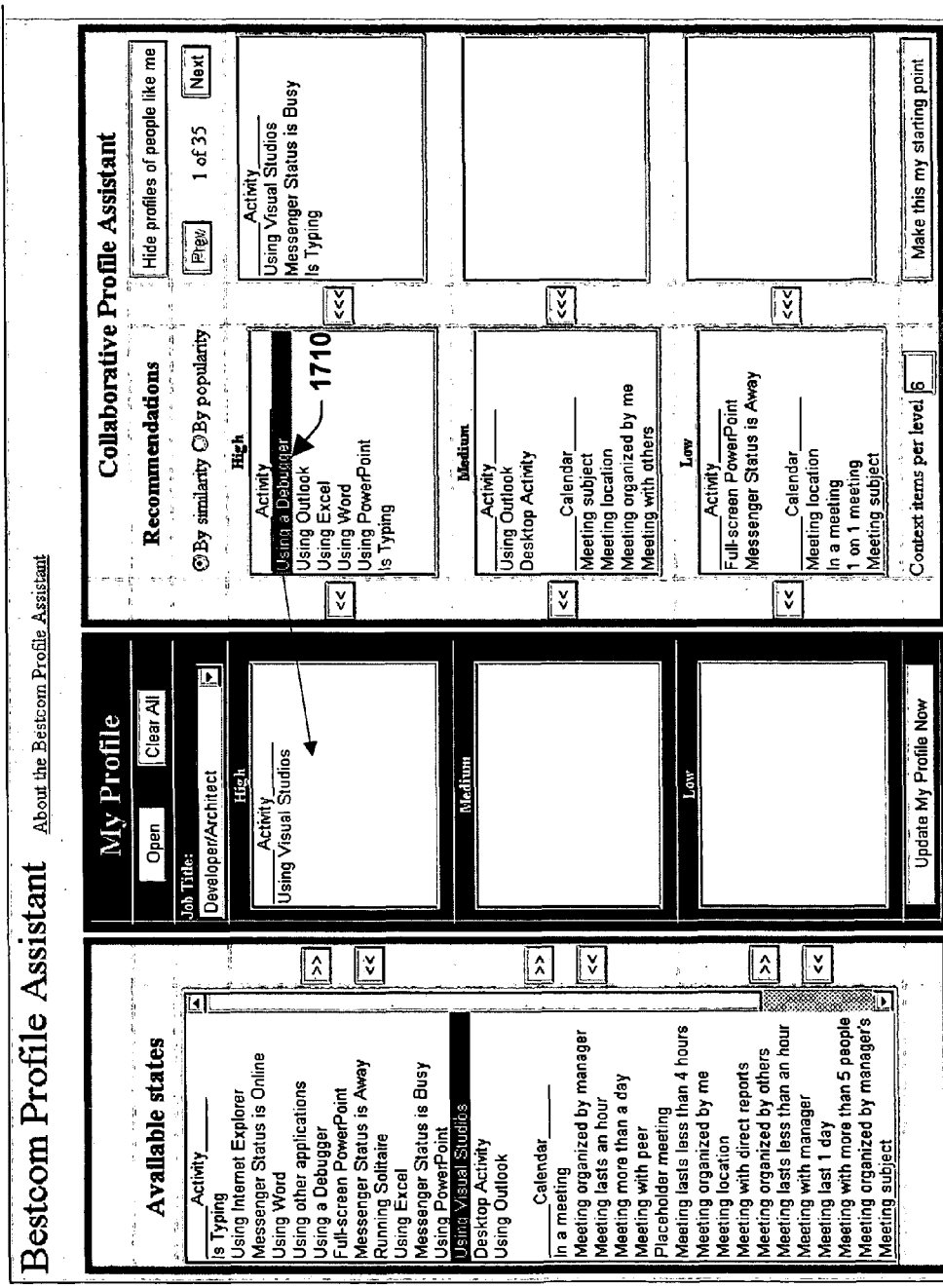
Figure 18:
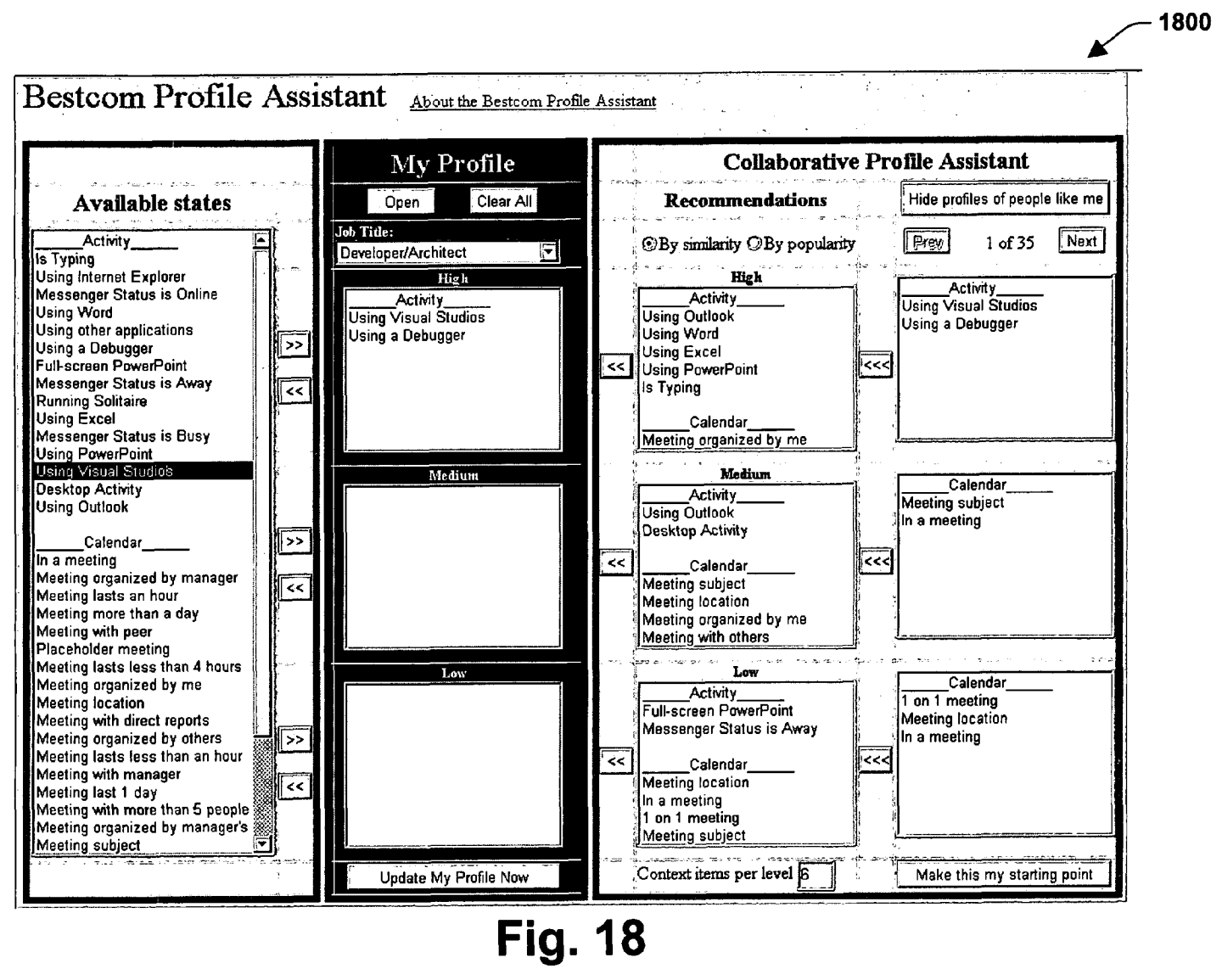
Figure 19:
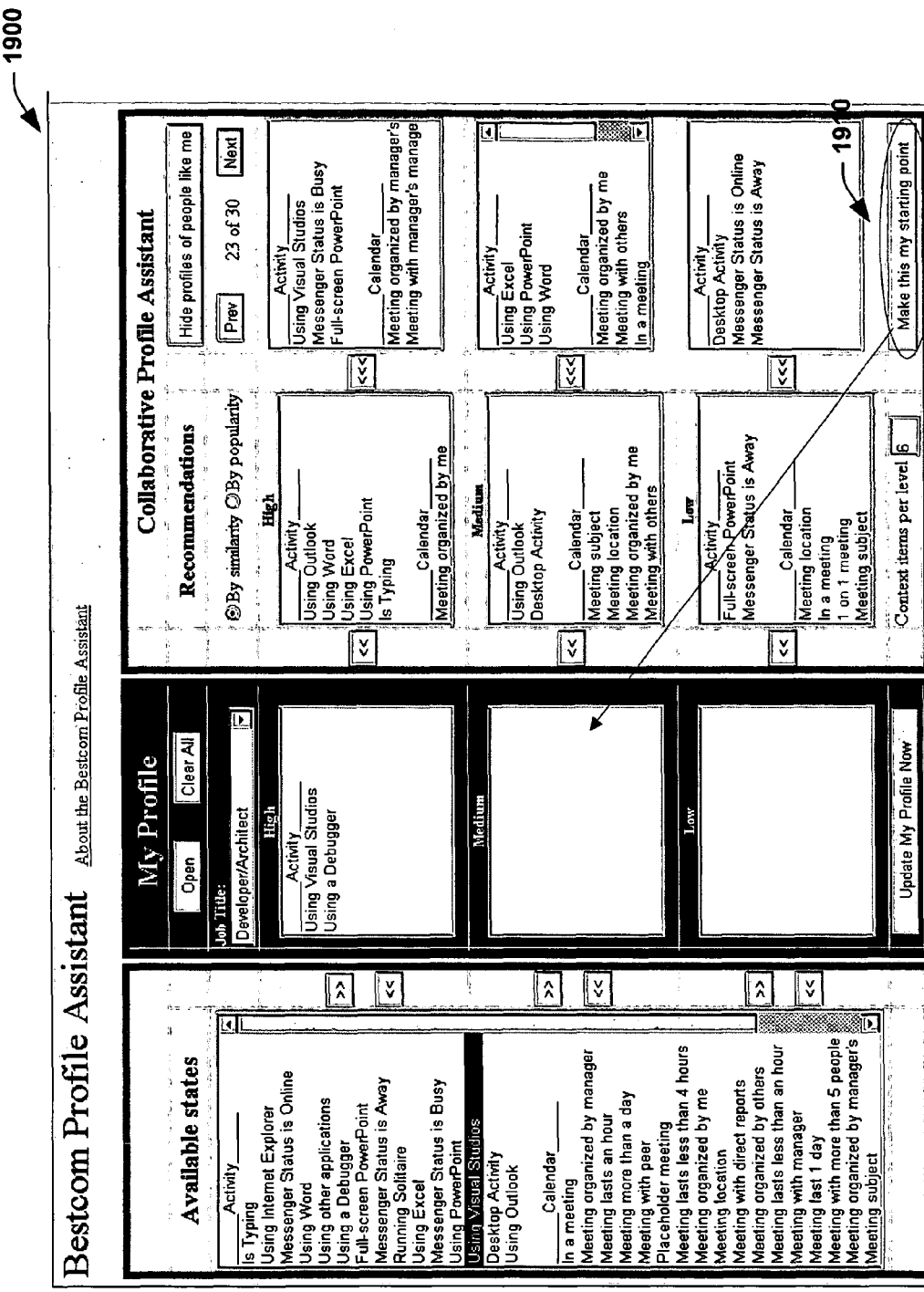
Figure 20:
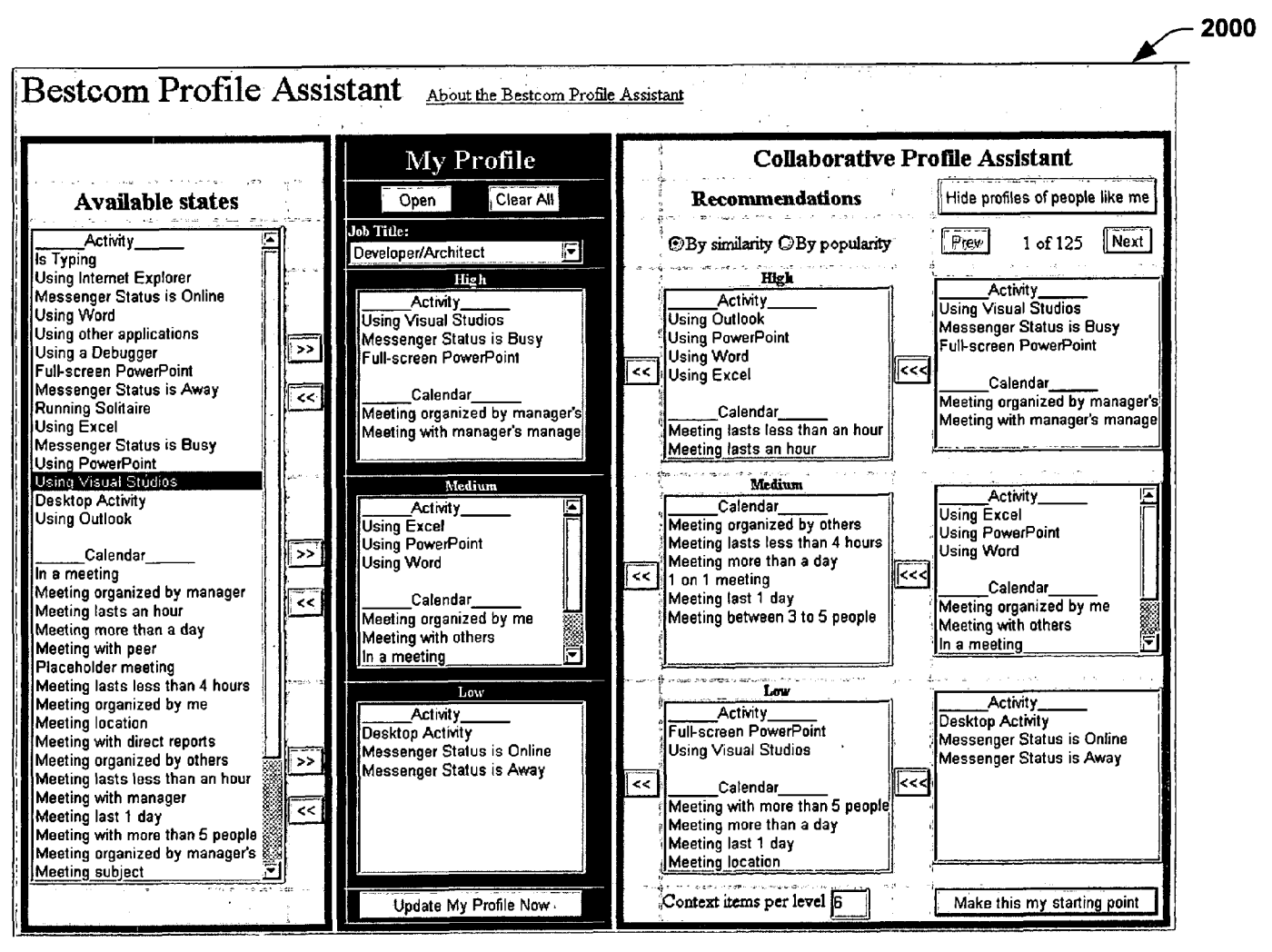

FIGS. 15-20 illustrate various features of the subject invention. FIG. 15 illustrates changing a demographic from Program Manager to Developer/Architect at 1510 leads to other inferences and similar profiles. FIG. 16 illustrates how the user has selected one item, to add to define when he/she is in a state of high cost of interruption at 1610 (e.g., Using the development package, Visual Studios). Now recommendations and the similarities are updated to reflect this preference. At FIG. 17, the user now goes to the recommendation list and selects, Using a Debugger at 1710. This is added to the list and inference occurs, leading to changes in both the Recommendations and the similar profiles columns in FIG. 18. At FIG. 19, the user scans through some profiles along the dimension of most to least similar (over a threshold), and pauses to view one that seems to capture his/her preferences. The user selects, "Make this my starting point," at 1910 and loads in this profile to use as their own preferences. Now, inference of recommendations for extension occur again, and the recommendation list and most similar profile lists are updated as illustrated in FIG. 20.

Figure 21:
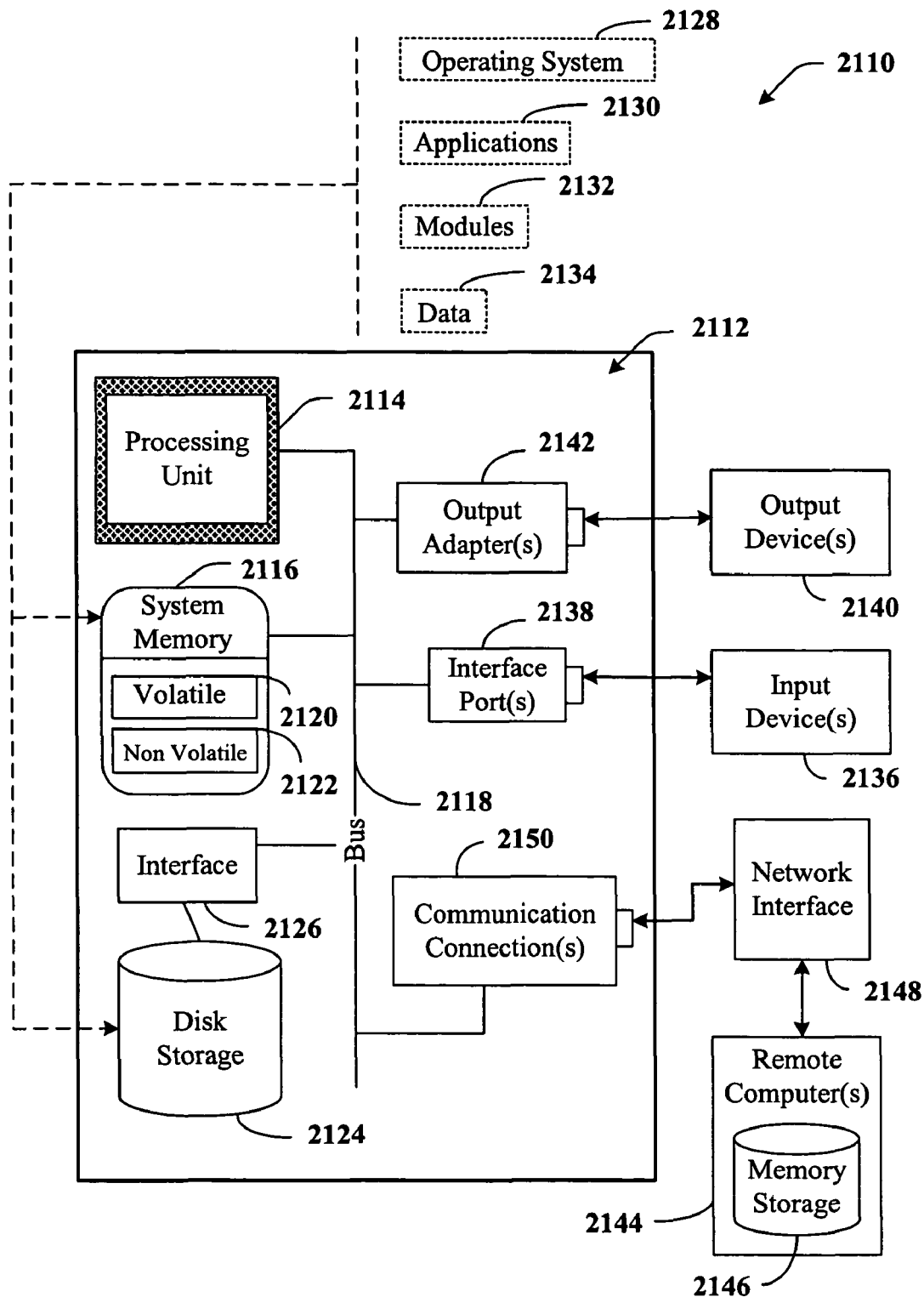
FIG. 21 is a schematic block diagram illustrating a suitable operating environment in accordance with an aspect of the present invention.

With reference to FIG. 21, an exemplary environment 2110 for implementing various aspects of the invention includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Dual microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable ROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/non-removable, volatile/non-volatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer system 2112. System applications 2130 take advantage of the management of resources by operating system 2128 through program modules 2132 and program data 2134 stored either in system memory 2116 or on disk storage 2124. It is to be appreciated that the present invention can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapter 2142 is provided to illustrate that there are some output devices 2140 like monitors, speakers, and printers, among other output devices 2140, that require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

Figure 22:
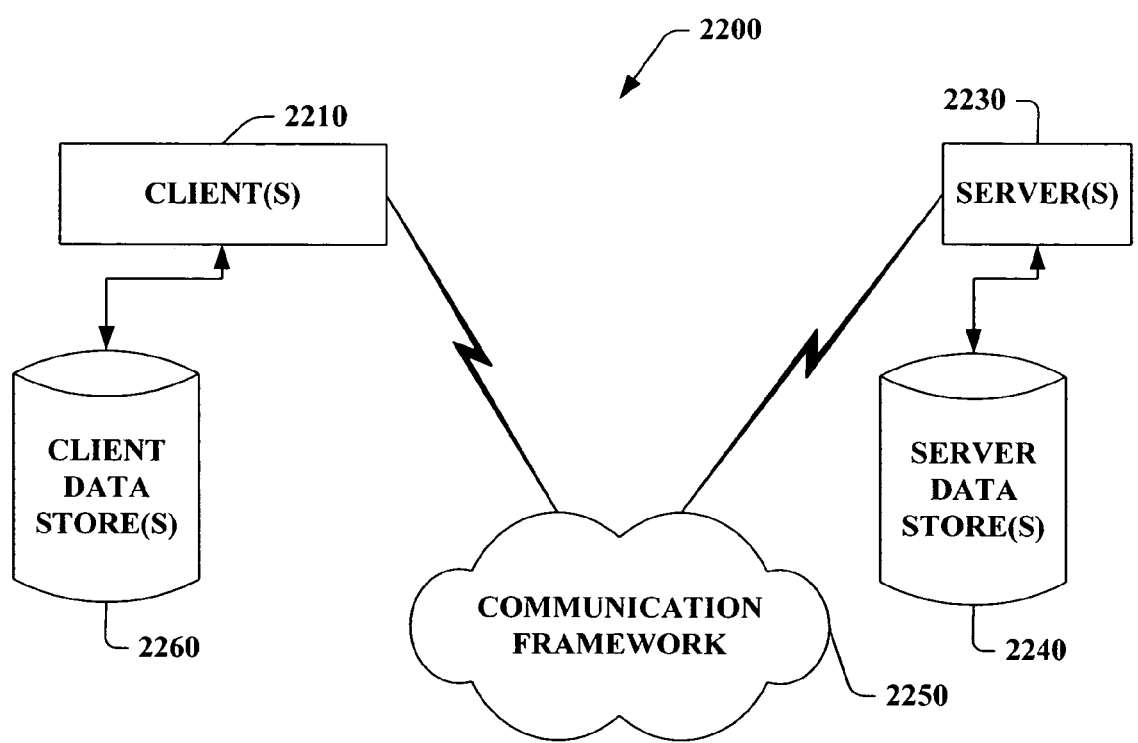
FIG. 22 is a schematic block diagram of a sample-computing environment with which the present invention can interact.

FIG. 22 is a schematic block diagram of a sample-computing environment 2200 with which the present invention can interact. The system 2200 includes one or more client(s) 2210. The client(s) 2210 can be hardware and/or software (e.g., threads, processes, computing devices). The system 2200 also includes one or more server(s) 2230. The server(s) 2230 can also be hardware and/or software (e.g., threads, processes, computing devices). The servers 2230 can house threads to perform transformations by employing the present invention, for example. One possible communication between a client 2210 and a server 2230 may be in the form of a data packet adapted to be transmitted between two or more computer processes. The system 2200 includes a communication framework 2250 that can be employed to facilitate communications between the client(s) 2210 and the server(s) 2230. The client(s) 2210 are operably connected to one or more client data store(s) 2260 that can be employed to store information local to the client(s) 2210. Similarly, the server(s) 2230 are operably connected to one or more server data store(s) 2240 that can be employed to store information local to the servers 2230.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system that facilitates generation of a system profile, comprising:

a storage component that receives data relating to respective existing profiles of a community of disparate users, the existing profiles are generated by a plurality of client computers and represent application configuration settings used by the respective users of the client computers;

an analyzer that processes the existing profile data for the community of users in view of demographic data of a first user and selects a subset of the existing profiles to present to the first user based on similarities between the first user and the respective users in the community;

a filter component that applies collaborative filtering in accordance with the analyzer to process previous system settings preferences of existing users in the community to predict likely or possible settings or profiles for new users of a system, the filter component identifies software settings or preferences about context-sensitive computing that are applicable to an application employed by the first user; and a user interface that displays the subset of existing profiles selected by the analyzer, the user interface having at least one input to select from the displayed subset of profiles, the selected profile is used to configure the application settings for the first user; wherein the profiles include user definitions of a cost of interruption associated with each of a set of activities defined in a communications application, and the filter component selects at least one of the profiles for presentation to the first user based on a calculated similarity between the cost of interruption definitions in the existing profiles and the first user's cost of interruption definitions, wherein selection of the at least one profile by the first user applies the configuration settings defined in the selected profile to the communications application employed by the first user.

2. The system of claim 1, the analyzer employs collaborative filtering to select the subset of existing profiles to present to the first user.

3. The system of claim 1, the existing profiles are generated from a plurality of client computers belonging to the users in the community that generate profile settings in accordance with various applications.

4. The system of claim 3, the applications include communications systems, general computing system, operating system settings, development system applications, and applications employing configuration or operation settings that are applied to customize the applications according to users preferences.

5. The system of claim 1, the analyzer applies statistical processes, mathematical processes, or models to the storage component to determine one or more existing profiles to be displayed for selection at the user interface.

6. The system of claim 1, the filter component includes one or more algorithms including memory based methods, model-based methods, and hybrid methods employing portions of the memory and model based methods.

7. The system of claim 1, the filter component employs explicit or implicit voting to determine the system settings preferences of disparate users in the community in order to predict the likely or possible settings or profiles for new users of the system.

8. The system of claim 7, the filtering component determines votes of an active user in the community of users based on partial information regarding the active user and a set of weights calculated from a user database.

9. The system of claim 1, the filter component employs at least one of a Bayesian classifier or a Bayesian network to determine a potential profile.

10. The system of claim 1, the filter component employs inference techniques or statistical clustering methods to reason about a likelihood that a user with some preferences or demographic information would agree with other previously unspecified settings or preferences.

11. The system of claim 1, the application processes context, including time of day, day of week, a call priority of individuals, and groups of people.

12. The system of claim 1, the application employs cost-benefit rules for routing messages between parties.

13. The system of claim 1, the analyzer determines a recommended profile for the first user based on demographic information of the first user, according to a popularity of the existing profiles, according to similarity between the existing profiles and the first user's demographic information, and according to settings associated with a parameter.

14. The system of claim 1, further comprising a profile assistant interface that provides recommended profile settings to the first user.

15. The system of claim 14, the profile assistant is a web-based application.

16. A computer readable medium having computer readable instructions stored thereon for implementing the components of claim 1.

17. A method for automatically generating a preference profile, comprising:
employing a processor executing computer-executable instructions stored on a computer-readable storage medium to implement the following acts:
storing a plurality of preference settings for a communications application in a database, the plurality of preference settings are those used by a corresponding plurality of users of the communications application and are employed to configure the communications application, the preference settings including user definitions of a cost of interruption associated with each of a set of activities defined in a communications application;
automatically applying collaborative filtering to the database to process previous system settings preferences of the plurality of users to predict likely or possible settings or profiles for new users to determine a subset of the plurality of preference settings for presentation to a new user of the communications application;
identifying software settings or preferences about context-sensitive computing that are applicable to an application employed by the new user;
selecting one of the subset of preference settings for presentation to the new user based at least in part on similarities between cost of interruption definitions indicated by the new user and the cost of interruption definitions employed by the plurality of users for the communications application;
configuring the communications application for the new user using the selected preference setting.

18. A system embodied on a computer-readable storage medium for automatically generating a preference profile, comprising:
means for aggregating existing configurations employed by a community of disparate users for a computer or a computer application, each existing configuration corresponding to a disparate user in the community and including a user definition of a cost of interruption associated with each of a set of activities defined in a communications application;
means for filtering the existing configurations to process previous system settings preferences of the community of disparate users to predict likely or possible settings or profiles for new users, the means for filtering identifies software settings or preferences about context-sensitive computing that are applicable to an application employed by a new user;
means for selecting one of the potential subset of configuration settings based on calculated similarities between the cost of interruption definitions in the existing configurations and a new user's cost of interruption definitions to determine a potential subset of configuration settings for use by the new user;
means for configuring the new user's computer or computer application using the selected configuration setting;
means for updating the new user's configuration with the selected configuration setting; and
means for refiltering the existing configurations based on the updated configuration.

* * * * *